US009979769B2

(12) United States Patent
Pilli et al.

(10) Patent No.: US 9,979,769 B2
(45) Date of Patent: May 22, 2018

(54) SYSTEM AND METHOD FOR AUDIO CONFERENCING

(71) Applicant: Nuance Communications, Inc., Burlington, MA (US)

(72) Inventors: Sridhar Pilli, Fremont, CA (US); Mahesh Godavarti, Cupertino, CA (US)

(73) Assignee: Nuance Communications, Inc., Burlington, MA (US)

( * ) Notice: Subject to any disclaimer, the term of this patent is extended or adjusted under 35 U.S.C. 154(b) by 503 days.

(21) Appl. No.: 14/256,561

(22) Filed: Apr. 18, 2014

(65) Prior Publication Data

US 2015/0302865 A1    Oct. 22, 2015

(51) Int. Cl.

| G10L 21/00 | (2013.01) |
|---|---|
| H04M 3/42 | (2006.01) |
| H04L 29/06 | (2006.01) |
| H04M 3/56 | (2006.01) |
| G10L 21/02 | (2013.01) |

(52) U.S. Cl.
CPC .......... *H04L 65/604* (2013.01); *H04M 3/562* (2013.01); *H04M 3/568* (2013.01); *G10L 21/02* (2013.01); *H04L 65/403* (2013.01); *H04M 3/569* (2013.01)

(58) Field of Classification Search
CPC .................................................... H04B 1/667
USPC ........................................................ 704/205
See application file for complete search history.

(56) References Cited

U.S. PATENT DOCUMENTS

| 8,095,120 B1* | 1/2012 | Blair ..................... H04M 3/562 379/202.01 |
|---|---|---|
| 2010/0039962 A1* | 2/2010 | Varesio ................... H04M 3/56 370/260 |
| 2010/0124321 A1* | 5/2010 | Alexandrov .......... H04L 65/403 379/202.01 |
| 2010/0165889 A1* | 7/2010 | Madabhushi ....... H04M 3/2227 370/261 |
| 2011/0038281 A1* | 2/2011 | Saleem ............... H04L 12/1822 370/260 |

(Continued)

OTHER PUBLICATIONS

Non-Final Office Action issued in related U.S. Appl. No. 14/256,567 dated Nov. 2, 2015.

(Continued)

*Primary Examiner* — Daniel Washburn
*Assistant Examiner* — Timothy Nguyen
(74) *Attorney, Agent, or Firm* — Brian J. Colandreo; Michael T. Abramson; Holland & Knight LLP

(57) ABSTRACT

The present disclosure is directed towards an audio conferencing method. Some embodiments may include receiving, at a first mixing device, an audio signal from a first user associated with an audio conference. Embodiments may further include processing the audio signal at the first mixing device to generate a processed audio signal and transmitting the processed audio signal to a second mixing device, wherein the first mixing device and the second mixing device are distributed over a network in a cascaded configuration. Embodiments may also include receiving, at the second mixing device, a third audio signal from a second user associated with the audio conference and processing the third audio signal at the second mixing device to generate a second processed audio signal.

11 Claims, 23 Drawing Sheets

(56) References Cited

U.S. PATENT DOCUMENTS

| | | | | |
|---|---|---|---|---|
| 2011/0075830 A1* | 3/2011 | Dreher | .................. | H04M 3/436 |
| | | | | 379/202.01 |
| 2013/0028115 A1* | 1/2013 | Nerst | .................. | H04L 12/1827 |
| | | | | 370/252 |
| 2013/0250035 A1* | 9/2013 | Murali | .................... | H04M 3/56 |
| | | | | 348/14.09 |
| 2015/0039691 A1* | 2/2015 | Sharma | ............... | H04L 65/1016 |
| | | | | 709/204 |
| 2015/0154291 A1* | 6/2015 | Shepherd | .......... | G06F 17/30861 |
| | | | | 707/748 |
| 2015/0304502 A1 | 10/2015 | Pilli | | |

OTHER PUBLICATIONS

Notice of Allowance issued in related U.S. Appl. No. 14/256,567 dated May 20, 2016, 8 pages.
Non-Final Office Action issued in related U.S. Appl. No. 14/256,567 dated Nov. 16, 2016, 31 pages.
Final Office Action issued in related U.S. Appl. No. 14/256,567 dated May 18, 2017.
Non-Final Office Action issued in related U.S. Appl. No. 14/256,567 dated Nov. 15, 2017.

\* cited by examiner

SYSTEM AND METHOD FOR AUDIO CONFERENCING

TECHNICAL FIELD

This disclosure relates to signal processing systems and, more particularly, to a system and method for audio conferencing.

BACKGROUND

Existing audio conferencing systems often encounter various problems. Some of these include bandwidth problems, mixer capacity (i.e. inability to handle a large number of endpoints), and voice quality issues. For example, geographically spread out participant streams have to be brought to the centralized mixer location before mixing in and the same mixed content may need to be sent back to individual legs. This consumes high amounts of bandwidth as the number of participants increases. Also, this may result in numerous voice quality problems related to long distance transmission (e.g., level imbalances, long echo, etc.).

Moreover, not all participants may be talking at any particular point in time during the audio conference. Existing systems mix unwanted streams, the mixed speech may get clipped, unwanted background noise may get mixed in, etc. This may result in a waste of the processing power on the mixer as unwanted streams are mixed, thereby limiting the number of maximum participants and/or endpoints in an audio conference.

Further, and with regard to voice quality, background noise from listeners and active talkers may be mixed into the audio conference which causes fatigue and prevents the user from focusing on the conversation. Moreover, acoustic echo reflections from hybrid elements and end points may also make it difficult for a user to follow the conversation. With devices such as mobile phones, desk phones and computers as end points there may be unbalanced speech levels from various talkers. The end points may or may not handle all scenarios and the ones without any enhancement are bound to inject impairments.

SUMMARY OF DISCLOSURE

In one implementation, an audio conferencing method, in accordance with this disclosure, may include receiving, at a first mixing device, an audio signal from a first user associated with an audio conference. The method may further include processing the audio signal at the first mixing device to generate a processed audio signal and transmitting the processed audio signal to a second mixing device, wherein the first mixing device and the second mixing device are distributed over a network in a cascaded configuration. The method may also include receiving, at the second mixing device, a third audio signal from a second user associated with the audio conference and processing the third audio signal at the second mixing device to generate a second processed audio signal.

One or more of the following features may be included. In some embodiments, the method may include transmitting at least one of the first processed audio signal and the second processed audio signal to a third mixing device. The third mixing device and the second mixing device may be distributed over a network in a cascaded configuration. The method may further include ranking each user based upon, at least in part, one or more features associated with each user's audio signal. In some embodiments, the one or more features may include at least one of frequency of user speech, quality of user speech and duration of user speech. The method may also include dynamically updating the ranking based upon, at least in part, the received signals. In some embodiments, processing may include applying a voice quality enhancement algorithm to at least one of the audio signals. In some embodiments, applying a voice quality enhancement algorithm may include applying at least one of noise reduction, echo cancellation, and level control enhancements to at least one of the audio signals. The method may further include transmitting, from the second mixing device, at least one of a voice intelligibility and an adaptive level enhancement solution to each user's listening environment. In some embodiments, processing may be based upon, at least in part, the ranking.

In another implementation, an audio conferencing system is provided. The system may include a first mixing device configured to receive an audio signal from a first user associated with an audio conference, the first mixing device further configured to process the audio signal to generate a processed audio signal, the first mixing device further configured to transmit the processed audio signal. The system may further include a second mixing device configured to receive the processed audio signal, wherein the first mixing device and the second mixing device are distributed over a network in a cascaded configuration, the second mixing device configured to receive a third audio signal from a second user associated with the audio conference and to process the third audio signal at the second mixing device to generate a second processed audio signal.

One or more of the following features may be included. In some embodiments, at least one of the first mixing device and the second mixing device may be configured to transmit at least one of the first processed audio signal and the second processed audio signal to a third mixing device. The third mixing device and the second mixing device may be distributed over a network in a cascaded configuration. The method may further include ranking each user based upon, at least in part, one or more features associated with each user's audio signal. In some embodiments, the one or more features may include at least one of frequency of user speech, quality of user speech and duration of user speech. The method may also include dynamically updating the ranking based upon, at least in part, the received signals. In some embodiments, processing may include applying a voice quality enhancement algorithm to at least one of the audio signals. In some embodiments, applying a voice quality enhancement algorithm may include applying at least one of noise reduction, echo cancellation, and level control enhancements to at least one of the audio signals. The method may further include transmitting, from the second mixing device, at least one of a voice intelligibility and an adaptive level enhancement solution to each user's listening environment. In some embodiments, processing may be based upon, at least in part, the ranking.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION

Embodiments provided herein are directed towards a audio conferencing process 10 including an audio conferencing mixer that may be configured to save computational cycles in mixing the audio streams, and that reduces bandwidth usage while ensuring speech quality is intact. Audio conferencing process 10 may be configured to address voice quality, bandwidth, and mixer capacity issues by utilizing geographically cascaded mixers. In some embodiments, audio conferencing process 10 may be configured to mix only the top-N talkers, which leaves computational resources on the mixer for other tasks, thus saving transmission bandwidth. Embodiments may also include performing voice quality enhancement at all stages of the cascaded mixing system, which may help to remove background noise, echo, normalize the audio prior to mixing, enhance intelligibility of the mixed stream and to adjust any levels as necessary.

Figure 1:
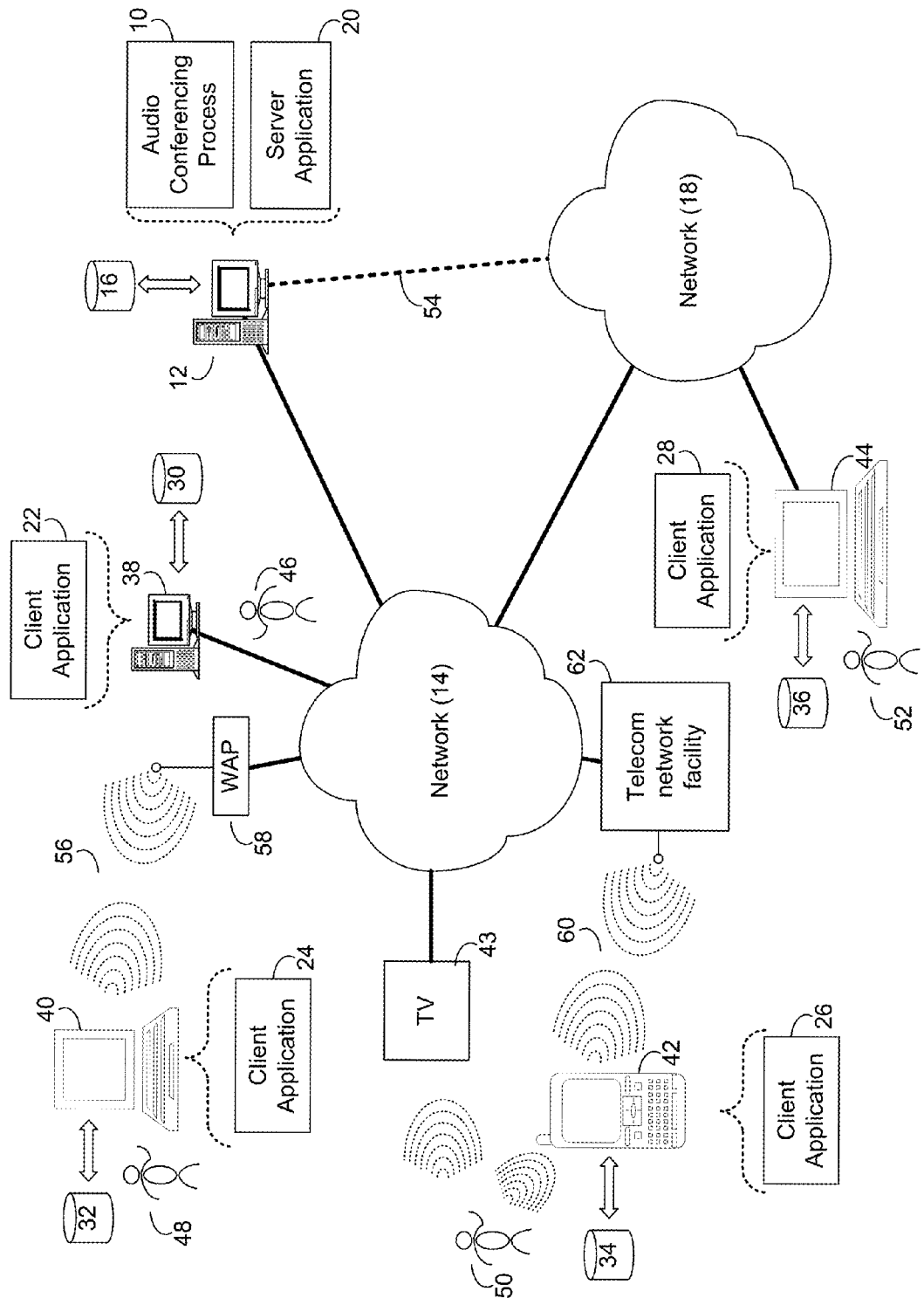
FIG. 1 is a diagrammatic view of an audio conferencing process in accordance with an embodiment of the present disclosure.
Figure 2:
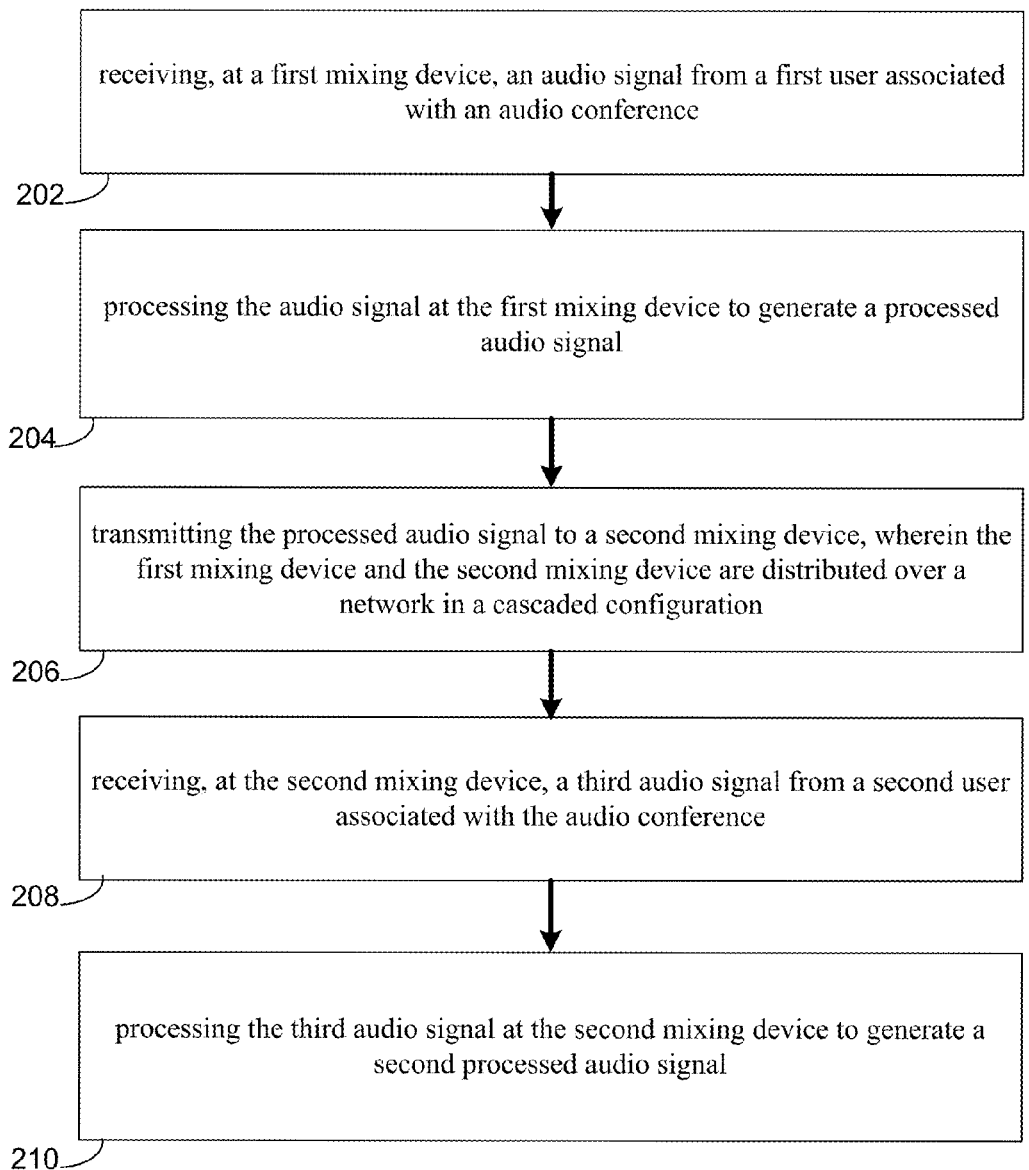
FIG. 2 is a flowchart of an audio conferencing process in accordance with an embodiment of the present disclosure.

Referring to FIG. 1, there is shown a audio conferencing process 10 that may reside on and may be executed by computer 12, which may be connected to network 14 (e.g., the Internet or a local area network). Server application 20 may include some or all of the elements of audio conferencing process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, a multiprocessor computer, one or more virtual machines running on a computing cloud, and/or a distributed system. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail in FIGS. 2-5, audio conferencing process 10 may include receiving (202), at a first mixing device, an audio signal from a first user associated with an audio conference. Audio conferencing process 10 may further include processing (204) the audio signal at the first mixing device to generate a processed audio signal and transmitting (206) the processed audio signal to a second mixing device, wherein the first mixing device and the second mixing device are distributed over a network in a cascaded configuration. Audio conferencing process 10 may further include receiving (208), at the second mixing device, a third audio signal from a second user associated with the audio conference and processing (210) the third audio signal at the second mixing device to generate a second processed audio signal.

The instruction sets and subroutines of audio conferencing process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

In some embodiments, audio conferencing process 10 may reside in whole or in part on one or more client devices and, as such, may be accessed and/or activated via client applications 22, 24, 26, 28. Examples of client applications 22, 24, 26, 28 may include but are not limited to a standard web browser, a customized web browser, or a custom application that can display data to a user. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, television 43, notebook computer 44, a server (not shown), a data-enabled, cellular telephone (not shown), and a dedicated network device (not shown).

One or more of client applications 22, 24, 26, 28 may be configured to effectuate some or all of the functionality of audio conferencing process 10. Accordingly, audio conferencing process 10 may be a purely server-side application, a purely client-side application, or a hybrid server-side/client-side application that is cooperatively executed by one or more of client applications 22, 24, 26, 28 and audio conferencing process 10.

Client electronic devices 38, 40, 42, 44 may each execute an operating system, examples of which may include but are not limited to Apple iOS™, Microsoft Windows™, Android™, Redhat Linux™, or a custom operating system.

Users 46, 48, 50, 52 may access computer 12 and audio conferencing process 10 directly through network 14 or through secondary network 18. Further, computer 12 may be connected to network 14 through secondary network 18, as illustrated with phantom link line 54. In some embodiments, users may access audio conferencing process 10 through one or more telecommunications network facilities 62.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and smart phones to be interconnected using a short-range wireless connection.

Smart phone 42 is shown wirelessly coupled to network 14 via wireless communication channel 60 established between smart phone 42 and telecommunications network facility 62, which is shown directly coupled to network 14.

Figure 3:
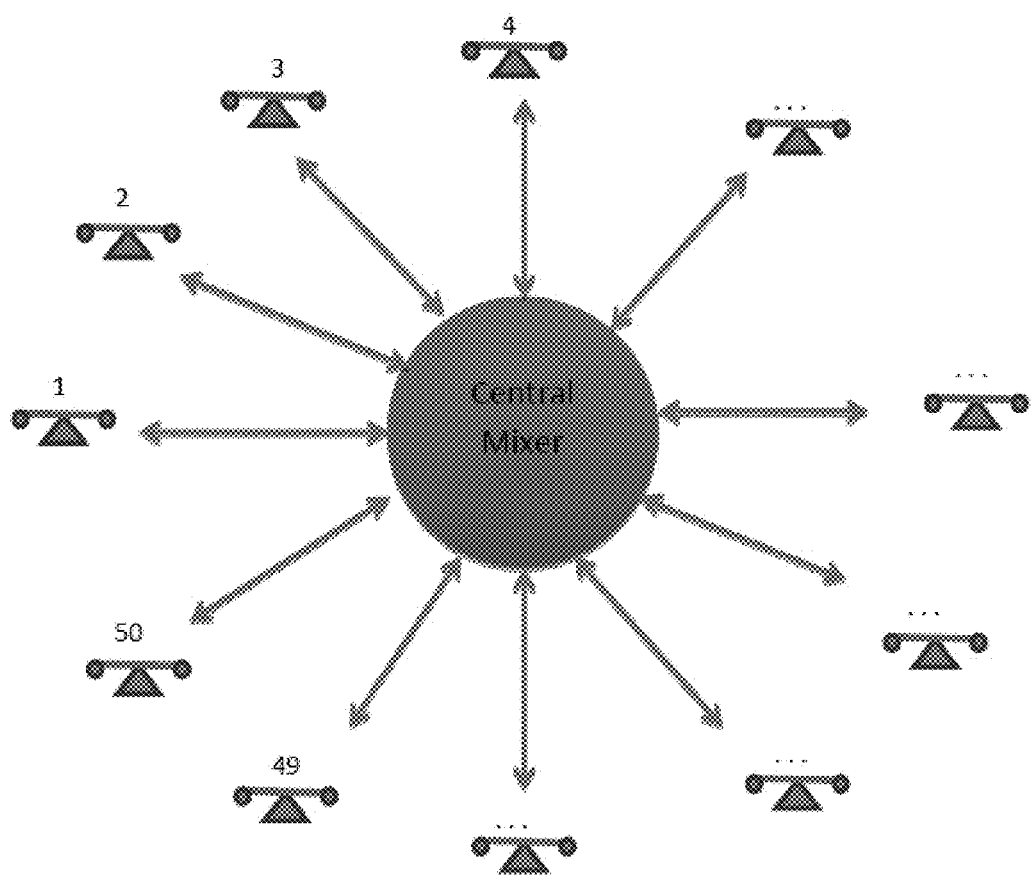
FIG. 3 is a diagrammatic view of a centralized mixer in accordance with an embodiment of the present disclosure.

Referring now to FIG. 3, an embodiment depicting a centralized mixer 300 is shown. In this particular configuration, each participant of the audio conference may be geographically spread out throughout a given network such as those shown in FIG. 1. Accordingly, each participant's stream may need to be brought to the centralized mixer location before mixing in and the same mixed content may need to be sent back to each individual leg. This consumes an increasing amount of bandwidth as the number of participants increases. Also, this brings with it numerous voice quality problems related to long distance transmission, some of which may include, but are not limited to level imbalances and long echo.

In some instances, the configuration of FIG. 3 may encounter voice quality issues. For example, background noise from listeners and active talkers may be mixed into the audio conference, which may detract from the conversation. Similarly, acoustic echo reflections from hybrid elements and end points makes it difficult to follow the conversation. With different types of devices (e.g. mobile phones, desk phones and computers) as end points there may be unbalanced speech levels from various talkers. The end points having voice quality enhancement embedded in them may or may not handle all scenarios and the end points without any enhancement are bound to inject impairments.

Further, in some cases not all of the participants may be talking during an audio conference. Hence, only those audio streams that have necessary information may need to be mixed. Without this, the mixed speech can get clipped, unwanted background noise can get mixed in and also the processing power on the mixer is wasted to mix unwanted streams. This may limit the number of maximum participants in an audio conference.

Traditional audio conferencing mixers do not have voice quality enhancement built in to the system and do not have the capability to cascade. The system of FIG. 3 may be configured to mix the top N streams, however, this is based on the instantaneous/average energy levels without knowing if the energy is valid speech or noise or for how long has it been on the line.

Figure 4:
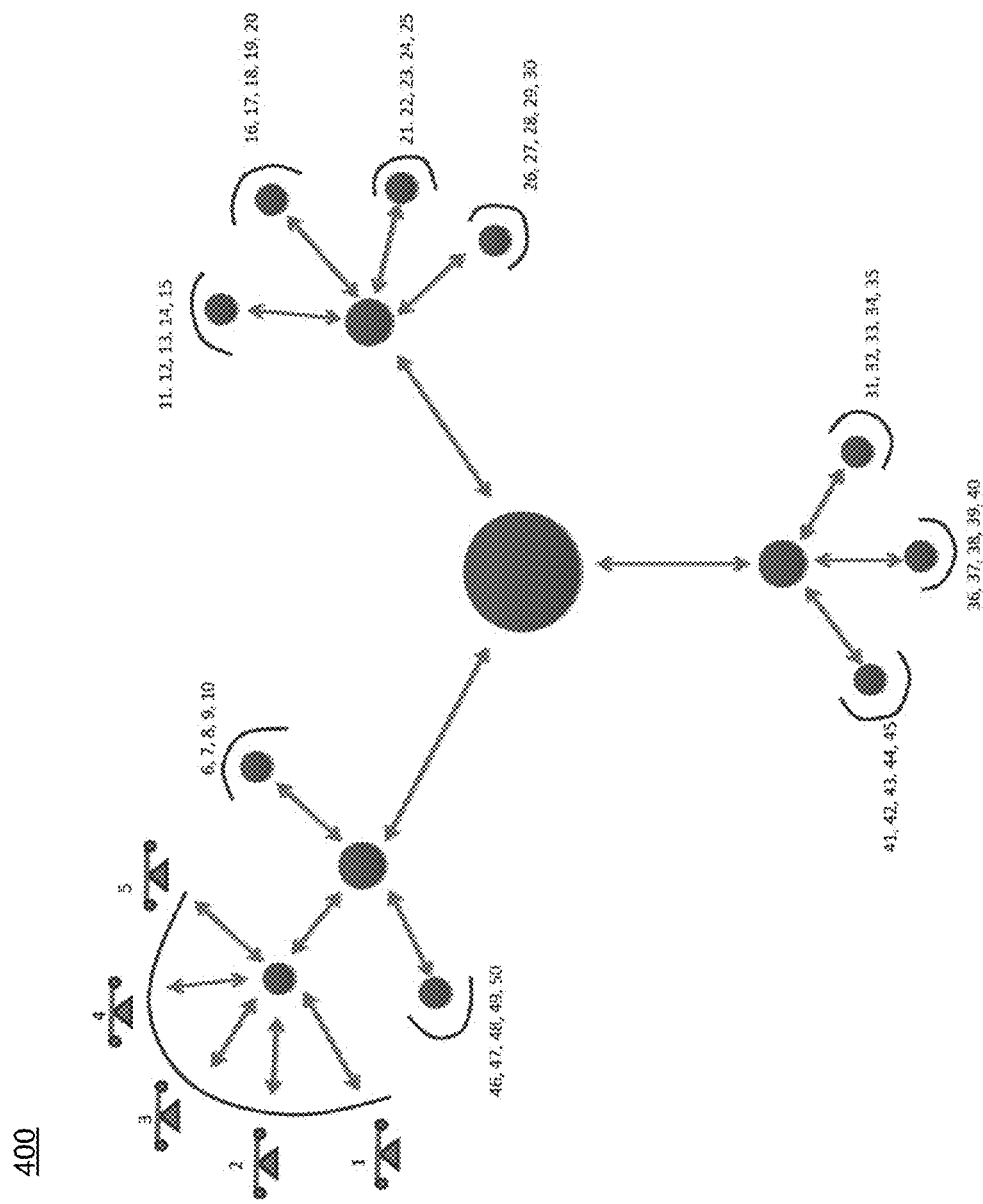
FIG. 4 is a diagrammatic view of a system configured to implement an audio conferencing process in accordance with an embodiment of the present disclosure.

Referring now to FIG. 4, an embodiment of audio conferencing process 10 in accordance with the present disclosure is provided. In this particular embodiment, audio conferencing process 10 may utilize cascaded mixers distributed geographically as opposed to using just one centralized mixer as shown in the embodiment of FIG. 3 (e.g. a conference with 10 participants where 4 are in the United States and 6 are in Europe with the mixer located in United States—by using one extra mixer device placed in Europe only one international link may be required instead of 6). This type of configuration may help in saving transmission bandwidth, reducing quality impairments and avoiding the need to have a powerful centralized machine. Further, audio conferencing process 10 may be configured to mix only the top N talkers. This type of configuration may allow for additional computational capacity on the mixer for other operations and may help to conserve transmission bandwidth. The configuration depicted in FIG. 4 is provided merely by way of example as any number of mixers and participants may be associated with the teachings of the present disclosure.

In some embodiments, audio conferencing process 10 may be configured to perform voice quality enhancement on all the legs at the mixer. As such, audio conferencing process 10 may be configured to perform voice quality enhancement at all stages of the cascaded mixing system, which may help to remove background noise, echo, normalize the audio prior to mixing, enhance intelligibility of the mixed stream and to adjust any levels as necessary.

Embodiments of audio conferencing process 10 described herein may be used with geographically dispersed cascaded mixers in order to handle a large number of participants. In addition to the particular configuration shown in FIG. 4, it should be noted that there may be any number of levels of cascading without departing from the scope of the present disclosure. For example, although in FIG. 4 the number of participants is limited to 50, embodiments of audio conferencing process 10 may be used with any number of participants (e.g. in the order of thousands). One possible example may include, but is not limited to, an all hands meeting across all of a corporation's global offices. In this case particular example, there may be a first level of cascaded mixer at an individual satellite office level. Accordingly, many such offices in a city could be cascaded into a city level mixer—second level. Many such cities could be cascaded to a country level mixer—third level. Many such countries could be cascaded to continent level mixer—fourth level. Additionally and/or alternatively, a fifth level mixer may be used to centrally mix the legs from each continent. Numerous other configurations may be used as well without departing from the scope of the present disclosure.

In some embodiments, audio conferencing process 10 may use one or more voice activity detector ("VAD") algorithms (discussed in further detail below) in order to accurately detect both speech and non-speech portions carried and also to maintain a history of the amount of talking carried out by each talker. Additional information regarding VAD may be found in United States Patent Publication Number 2011/0184732 having an application Ser. No. 13/079,705, which is incorporated herein by reference in its entirety. Additionally and/or alternatively, audio conferencing process 10 may utilize noise reduction, echo cancellation and level control enhancements in conjunction with audio conferencing on the same device.

Embodiments of audio conferencing process 10 may incorporate top N mixing. As used herein, the phrase "top N mixing" may rank each speaker in the decreasing order of whether to mix his speech or not and may also dynamically update the rank order. Audio conferencing process 10 may evaluate whether there is valid speech content from a participant using one or more voice activity detector algorithms. In some embodiments, this ranking may be based upon a history of how long a person has been talking. In operation, if a person has been talking for a long time then there may be a good chance that he or she will continue to talk so audio conferencing process 10 may rank that leg high for mixing. Alternatively, if audio conferencing process 10 has determined that a participant has not spoken for a predetermined and/or extended period of time then audio conferencing process 10 may rank that participant low.

As discussed above, and referring again to FIG. 4, embodiments of audio conferencing process 10 may utilize cascaded mixing techniques. For example, in some embodiments, each cascaded mixer may service a subset of participants. The top N mixing, discussed above, may be carried out on each of the cascaded mixers and a mixed stream from this cascaded mixer may be generated. This mixed stream may then act as an input to the next stage of cascade mixer. This process may proceed until reaching the centralized mixer. The mixed stream of the Top N centralized mixer may be sent down to each of its sub-mixers which plays it back to the participants of their respective sub-mixers. In some embodiments, if none of the participants of a cascade stage are talking there may not be a mixed stream available from this stage.

Embodiments of audio conferencing process 10 may utilize one or more voice quality features. Some of these may include, but are not limited to, noise reduction, echo cancellation and level control enhancements on speech coming from the participants towards the mixer so that any impairments on the ingress can be treated before mixing. Some features may also include voice intelligibility and adaptive level enhancement in the direction from mixer towards the participant so that individual listening environments may be addressed. In some embodiments, voice quality enhancement is needed on only those legs that have potential to be mixed in.

As discussed above, audio conferencing process 10 may utilize adaptive noise reduction ("ANR") techniques and one or more voice activity detector algorithms. In speech communication systems the presence of background interference in the form of additive background and channel noise may drastically degrade the performance of the system. Embodiments disclosed herein may incorporate noise reduction algorithms designed to improve the performance of communication systems by reducing noise in a single channel system without introducing audible speech distortion or musical noise. This type of algorithm may employ advanced spectral subtraction techniques based on masking properties of the human auditory system. The algorithm may continuously restore the natural clean speech against a wide variety of noise sources (e.g., car noise, street noise, babble noise, cockpit noise, train noise, harmonic noise, communication channel interference, office noise, wind and etc.). Therefore, it dramatically improves the communication quality—both perceptual quality and signal-to-noise ratio (SNR) measurements.

In some embodiments, ANR operations may include one or more features, some of which may include, but are not limited to, continuously and adaptively removing a wide variety of noise from speech with little speech distortions while preserving background noise characteristics. ANR algorithms may include a configurable maximum noise level suppression up to 21 dB (21 dB, 18 dB, 15 dB, 12 dB, 9 dB). Although the maximum suppression level of background noise is configurable, the actual level of suppression depends on what the local speech and noise characteristics are. For example, if the user configuration is 18 dB maximum attenuation, but at the situation of current local speech and noise characteristic, attenuating 18 dB may cause audible artifacts, an ANR algorithm may automatically reduce the level of attenuation to prevent naturalness of the original speech. In some embodiments, the ANR algorithm may include, for example, 15 ms algorithm latency, convergence time of less than 2 s, approximately 3.87 MCPS processing complexity using TI TMS320CC54x processor when zero-padding flag is turned on, and approximately 4.43 MCPS processing complexity using TI TMS320CC54x processor when zero-padding flag is turned off. Some embodiments may utilize an ANR algorithm having a comfort noise floor option with configurable noise floor level. Additionally and/or alternatively, an SNR adaptive mode may automatically enable maximum noise reduction for low-SNR inputs (i.e. SNR<12 dB), while applying moderate or minor reduction to the higher SNR inputs. This may reduce the noise aggressively when noise is really high, however in less noisy conditions, the level of noise reduction may adapt according to the signal SNR to minimize the undesirable impact on the speech signal due to noise reduction processing.

In some embodiments, and to further improve the accuracy of VAD decision and convergence time for the adaptive noise reduction, four major improvements are made to the VAD module. In some embodiments, a high-pass filter may be included, which may include (1) the reduction of number of critical band from 18 bands to 17 bands, and (2) some adjustments on boundary mapping of critical bands. In some embodiments, adding a high-pass filter before VAD processing may aid the decision for some noise type (esp. wind noise). At the same time, other modules in the system (i.e. tone detection) may need HPF. HPF may be added before VAD in some cases. Due to the limited-number of frequency bins, some bins may be mapped into different bands.

Additionally and/or alternatively, some embodiments of the VAD may be designed to give bias to active decision since it may be designed as part of adaptive noise reduction (ANR) module. When the decision is used for other purposes (e.g. ALC) the fast recognition of non-active speech becomes more and more important since this may affect ALC's convergence time though it may not affect ANR's performance. For example, when the input is clean on-off high-level tones with very short (e.g., 50 ms) silence gaps, the original VAD may not be able to recognize these silence gaps consistently. To overcome this, the improvement made here is to introduce a short-term energy Es(n) (time constant is about 11 ms).

$$E_s^i(n) = \beta E_s^i(n-1) + (1-\beta)E_n^i(n), \beta = 0.1$$

$$E_{sdB}^i(n) = 10\log_{10}E_s^i(n) \text{ dB}$$

$$\nabla E_{sdB}(n) = \sum_{\text{each critical band } i}\left(E_{sdB}^i(n) - \overline{E}^i(n)\right)$$

Where i is the index of critical band, n is the index of frame number. When $\nabla E_{sdB}(n)$ is below a threshold and the voicing parameter for current frame is low, the current frame is preliminary decided as a non-active frame. Of course, this preliminary decision will be smoothed by VAD hangover later.

Embodiments disclosed herein may improve the VAD initial convergence when idle code detection is not available. For example, the original VAD assumes the initial 100 ms of input signal are non-active and VAD states are kept in non-active state. These 100 ms signals are used to build up the initial VAD state variables, which will affect the initial convergence rate. This design can aggressively achieve very fast initial convergence. Embodiments disclosed herein may include both aggressive operating mode and normal operating mode for VAD. The aggressive operating mode is the same as the original VAD design, when idle code detection is enabled at "either", the VAD can be set to this mode to maintain the faster convergence. While idle code detection is not available or provisioned as other options, the VAD should be set as normal operating mode, in which for the first 40 ms, the VAD state variables is built up exponentially:

$$Eavg^i(n) = \frac{15}{16}Eavg^i(n-1) + \frac{1}{16}E^i(n)$$
$$Eavg^i(0) = 0, i = 0, 1, \ldots, 16$$

Note n is the frame index, and i is the critical band index.

Embodiments disclosed herein may improve the general VAD convergence time for various conditions. The following efforts are made to improve the VAD performance, and consequently to improve the ANR convergence time: Noise floor power spectral tracking for each critical band and improved computation of average energy for each critical band.

Noise floor power spectral $P^i(n)$ for i-th critical band at frame n is tracked even during speech frames. During the speech frame, if $P^i(n-1) < E^i(n)$ $$P^i(n) = \alpha P^i(n-1) + \beta E^i(n) + \gamma E^i(n-1), \alpha=0.998, \beta=0.05, \gamma=-0.048$$

else $$P^i(n) = E^i(n)$$

Where $E^i(n)$ is the input signal power at the i-th critical band at n-th frame.

The time-constant for updating average signal energy in dB is power-adapted. For the i-th critical band, and for n-th frame:

$$\overline{E}^i(n) = \alpha \overline{E}^i(n-1) + (1-\alpha)E^i(n) \text{ in dB}$$

Where $$\alpha = \alpha_H - \beta(E_H - E_{total}), \alpha_H = 0.97$$

Embodiments disclosed herein may improve VAD convergence after network dropouts. As observed from filed captures, GSM switches insert mute pattern when multiple frames are dropped. The long dropouts will reset VAD noise estimation and result in VAD re-convergence after network recovery. When the noise level after dropouts is large, it will take quite a long time for VAD to re-recognize the noise frames. The customer may complain the noise coming back after dropouts. To fasten the re-convergence time, changes are made in VAD to freeze updating noise spectral contour when such dropouts are detected. This on one hand will speed up the re-convergence (need no time to converge when noise unchanged before and after dropouts), on the other hand, this change will not affect initial convergence time since an initial noise spectral is assumed.

In some embodiments, the ideal noise reduction algorithm will only remove noise part from the noisy speech while maintain speech part untouched. However, in reality this is usually not possible to find such an ideal algorithm. Therefore the realistic requirement for noise reduction algorithms becomes removing noise as much as possible while maintain the speech distortions as low as possible. Spectral shaping is designed to work together with ANR algorithm to reduce the perceptual speech distortion introduced by ANR. The goal of spectral shaping is to reduce perceptible speech artifacts introduced by ANR/NS while maintaining ANR/NS's ability to reduce noise. The idea is to boost perceptual important spectral areas of the processed speech, i.e. formants, to maintain the noise reduction the same, the spectral areas with less perceptual importance are suppressed further. Both objective and subjective tests show that spectral shaping improves quality of ANR/NS processed speech, especially for the tandem situation.

In some embodiments, adding a comfort noise floor option may help to avoid quite-line problem found in the field when noise reduction attenuates noise to a level that is too low, people may have dead-line perception. When the comfort noise floor option is turned on in the configuration, a comfort noise floor will be presented in the processed output. The noise floor level is configurable, the default value is about −55 dBov. The option is by default always on when noise silencer is turned on. For ANR feature, this option can be switched through user configuration. This option is recommended to be turned off when conducting any objective testing on ANR. But it is recommended to be turned on when involving subjective listening.

In some embodiments, adding a frame loss handling feature inside VAD through user-configurable interface of ANC may improve VAD re-convergence time when frame loss happened during speech. The design goals are to maintain fast re-convergence when frame loss happens, especially in the middle of noisy speech and to reduce mis-detection of frame loss which may cause level attenuation for small signal. In order to achieve the above targets, the following scheme is designed to handle possible frame loss: Short term frame energy E is computed, if E is very low and consistent for some period, possible frame loss may happen, within the first 300 ms continuous possible-loss frames, the current frame will not contribute to the noise spectral updates at all, if this period exceeds 300 ms, only a portion of current frame will contribute to the noise spectral updates, the percentage of contribution will be increased as time passes. When the possible-loss frames continue more than 1 s, the current frame will be fully contributed to the noise spectral updates, just like there is no frame loss handling. The assumption behind this scheme is that most quality-reasonable frame loss happens within 1 s. This feature can be configurable to disable, standard frame loss handling, and high frame loss handling through ANC interface. The recommended setting is standard. However, if most environments of customers' network are with high noise, while customers still want to utilize ANC to increase channel capacity by turning on network DTX, high frame loss handling is recommended.

In some embodiments, an SNR-adaptive ANC operation may be employed to balance the amount of noise reduced and the undesired impact on the speech signal due to the processing. The design goals of adding the adaptive mode to existing ANC, may include improving tandem ANC subjective performance, i.e. the cleaner the input is, the less aggressive attenuation is, and the less artifacts is introduced too. For example, if the original input SNR is high enough, the tandem output will be very similar to the first ANC output. This will also improve clean speech subjective qualities. The overall SNR-adaptive ANC design is based on the following SNR-Gain function:

$$\text{Gain} = \begin{cases} -18 \text{ dB} & \text{when } SNR \leq (\text{max}SNR - 18) \text{ dB} \\ (SNR - \text{max}SNR) \text{ dB} & \text{when } (\text{max}SNR - 18) \text{ dB} < SNR \leq \text{max}SNR \\ 0 \text{ dB} & \text{when } SNR > \text{max}SNR \end{cases}$$

Figure 5:
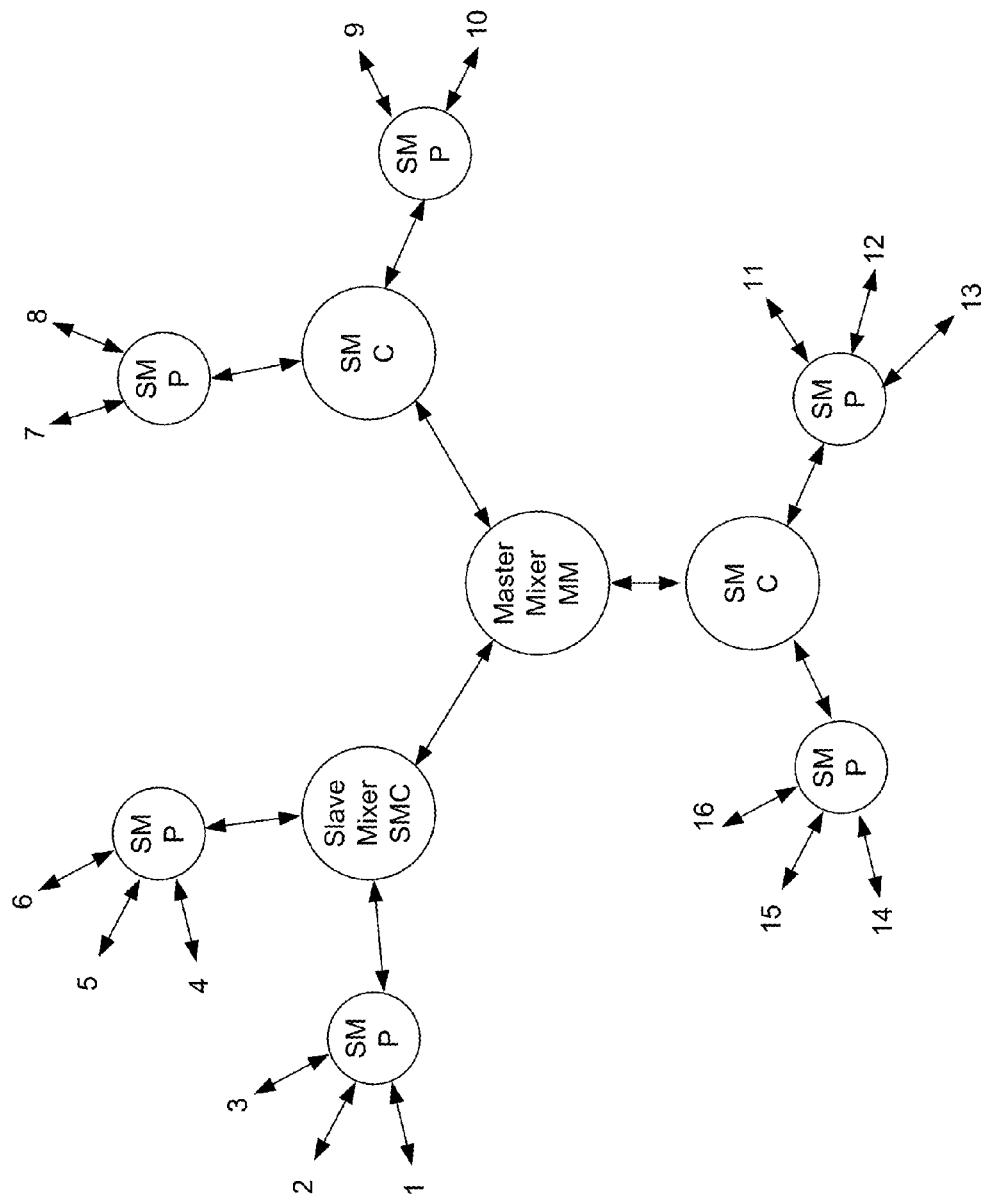
FIG. 5 is a diagrammatic view of a system configured to implement an audio conferencing process in accordance with an embodiment of the present disclosure.

Referring now to FIG. 5, an embodiment of audio conferencing process 10 depicting a master-slave mixing configuration is provided. In this particular configuration, a master mixer ("MM") may be in communication with one or more cascading slave mixers ("SMC"), which may each be in communication with one or more participant slave mixers ("SMP") through one or more cascading slave mixers ("SMC. In some embodiments, each SMP may be configured to connect a certain number of participants. In some cases, one SMC or MM may be connected to this SMP. The SMP may be configured to rank the individual participant legs based on talker activity. In a first type of configuration ("type-A"), the SMP may select the top N streams and send them without mixing to its master or next cascaded slave mixer. Individual streams from P participants connected to this slave mixer may be reduced to N individual streams (e.g., N<P).

In a second type of configuration ("type-B"), the SMP may select the top N streams and send the mixed stream. In this example, the P individual streams may be reduced to 1.

In some embodiments, the SMP may send a rank vector towards the next slave/master mixer and may also generate customized mixed streams for each individual participant. Each SMP may also execute a VQA Application. If Type B, the SMP may apply ANR, AEC and/or ALC on individual streams from P participants. If Type A or B, the SMP may apply EVI and ALE to the customized mixed stream to be played to each participant.

In some embodiments, each SMC may be connected to a single SMP. In some cases, many SMPs may be connected to a single SMC. For example, one other SMC in the cascading layer or one MM may be connected to this SMC. Each SMC may be configured to rank the streams (e.g., individual or mixed) and further reduce the set of streams. If Type A, the SMC may rank the individual streams coming from all SMPs and select the top N streams. The SMC may send the individual N streams to the next higher layer without mixing. If Type B, the SMC may rank the mixed streams and select the top-X mixed streams. For example, there may be N individual streams grouped as X mixed streams sent to the next higher layer. In some embodiments, each SMC may update the rank vector and send it towards the higher layer. Each SMC may also send mixed stream without any modifications coming from the higher layer (e.g. SMC or MM) to the lower layer (e.g. SMC or SMP).

In some embodiments, each master mixer may be connected to a combination of SMPs and SMCs. Each master mixer may execute one or more VQA Applications. For example, if Type A, the master mixer may apply ANR, AEC and ALC on individual streams entering the master mixer. In some embodiments, the master mixer may be configured to perform ranking and mixing operations. For example, if Type A, the master mixer may be configured to rank the individual streams coming in and mix the top-N participants to generate a mixed stream. Alternatively, if Type B, the master mixer may rank the mixed streams as they enter and mix the top-N participants to generate a mixed stream. The master mixer may be configured to send the same mixed stream towards SMCs or SMPs connected to a master mixer.

Figure 6:
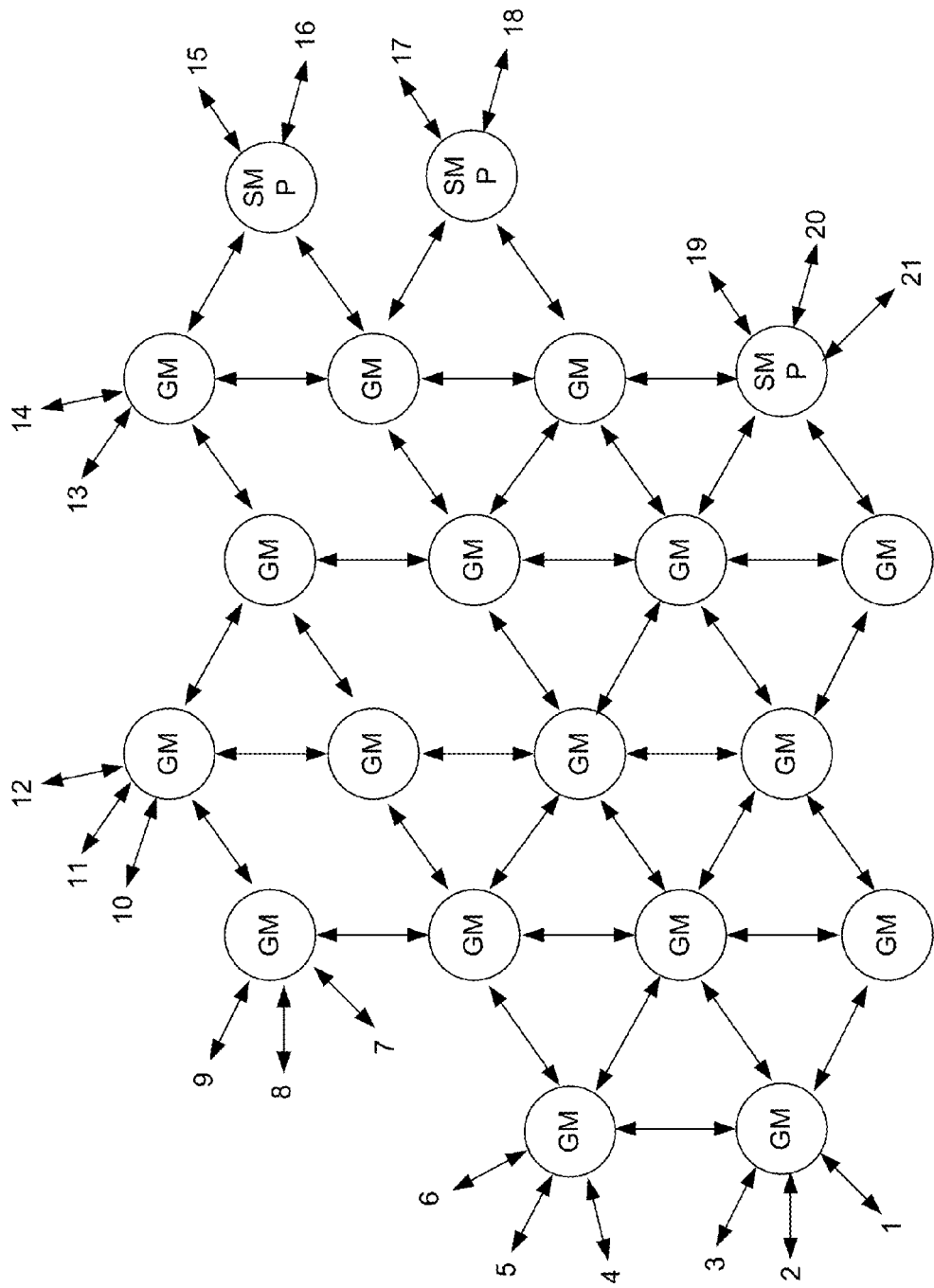
FIG. 6 is a diagrammatic view of a system configured to implement an audio conferencing process in accordance with an embodiment of the present disclosure.

Referring now to FIG. 6, an embodiment of audio conferencing process 10 depicting a grid mixing configuration is provided. In this particular configuration, a generalized version of the peer mixer is shown where each grid mixer may be connected to any number of other grid mixers. As shown in the Figure, redundancy is built in to ensure that the mixed stream from other grid mixers is sent in multiple paths to this grid mixer. Accordingly, even if one path fails there are other redundant paths available. In some embodiments, Type A and Type B configurations may be available. In some embodiments, the redundancy for the grid mixer may result from the fact that the mixed stream/audio content from other mixers may reach this mixer in multiple paths. For example, even if one or a few paths fails due to transmission errors and/or link failure there may be information coming from other paths.

Figure 7:
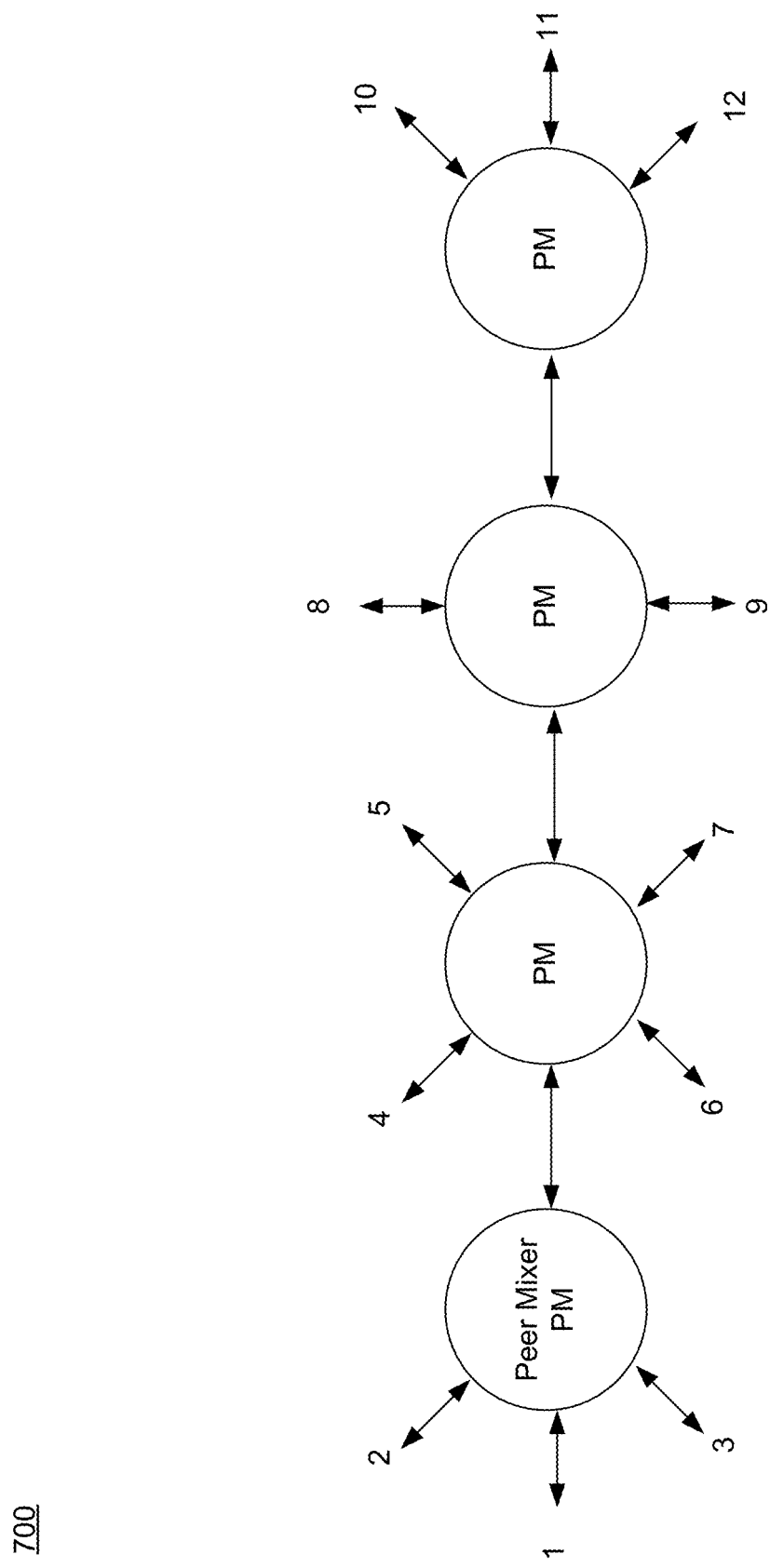
FIG. 7 is a diagrammatic view of a system configured to implement an audio conferencing process in accordance with an embodiment of the present disclosure.

Referring now to FIG. 7, an embodiment of audio conferencing process 10 depicting a peer mixing configuration is provided. In this particular configuration, there may be many participants connected to a particular peer mixer but at the most only two other peer mixers may be connected to it. The peer mixing configuration may be configured to perform rank and mix operations as discussed herein. For example, if Type-A, the peer mixer may rank and select the top-N talkers from the participants connected to it and the individual streams coming from the peer mixers connected to it. Individual streams may be sent along with a rank vector to the connected peer mixers. A mixed stream may also be generated. As used herein, the phrase "top-N" may refer to a subset that may be based upon, at least in part, an activity ranking.

If Type-B, the peer mixer configuration may be configured to rank and select the top-N talkers from the participants connected to it as well as the mixed streams received from the peer mixers connected to it. A mixed stream may be sent along with rank vector to the connected peer mixers. A mixed stream may also be generated.

If Type-C, the operation may be similar to that of Type-B except that no rank information may be sent to the other peer mixers. For example, if there are only two peer mixers connected to each other and there are a few participants connected to each participant.

In some embodiments, a peer mixing configuration may employ one or more VQA applications. The VQA application may be configured to apply one or more of ANR, AEC, ALC on individual streams coming from each participant. The VQA application may also apply EVI and ALE on customized mixed stream generated for each participant.

Figure 8:
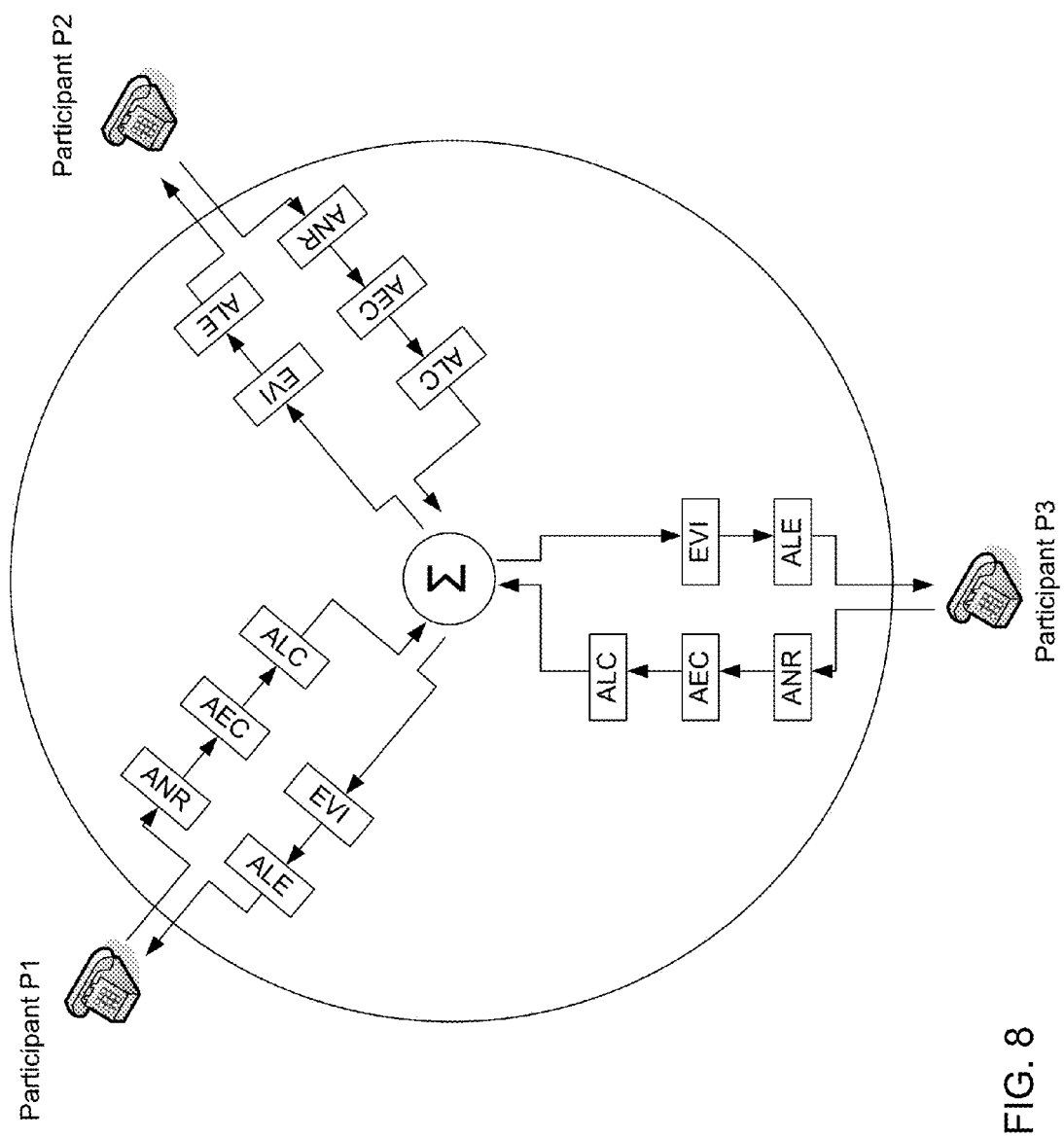
FIG. 8 is a diagrammatic view of a system configured to implement an audio conferencing process in accordance with an embodiment of the present disclosure.

Referring now to FIG. 8, an embodiment of audio conferencing process 10 depicting a centralized mixer having various VQA components is provided. In this particular example, three participants (i.e., P1-P3) are shown, however, any number of participants may be involved without departing from the teachings of the present disclosure. In some embodiments, prior to mixing, noise reduction, echo suppression and operations configured to normalize levels to the target speech level may be employed. Once mixing has been performed EVI and ALE may be applied.

Figure 9:
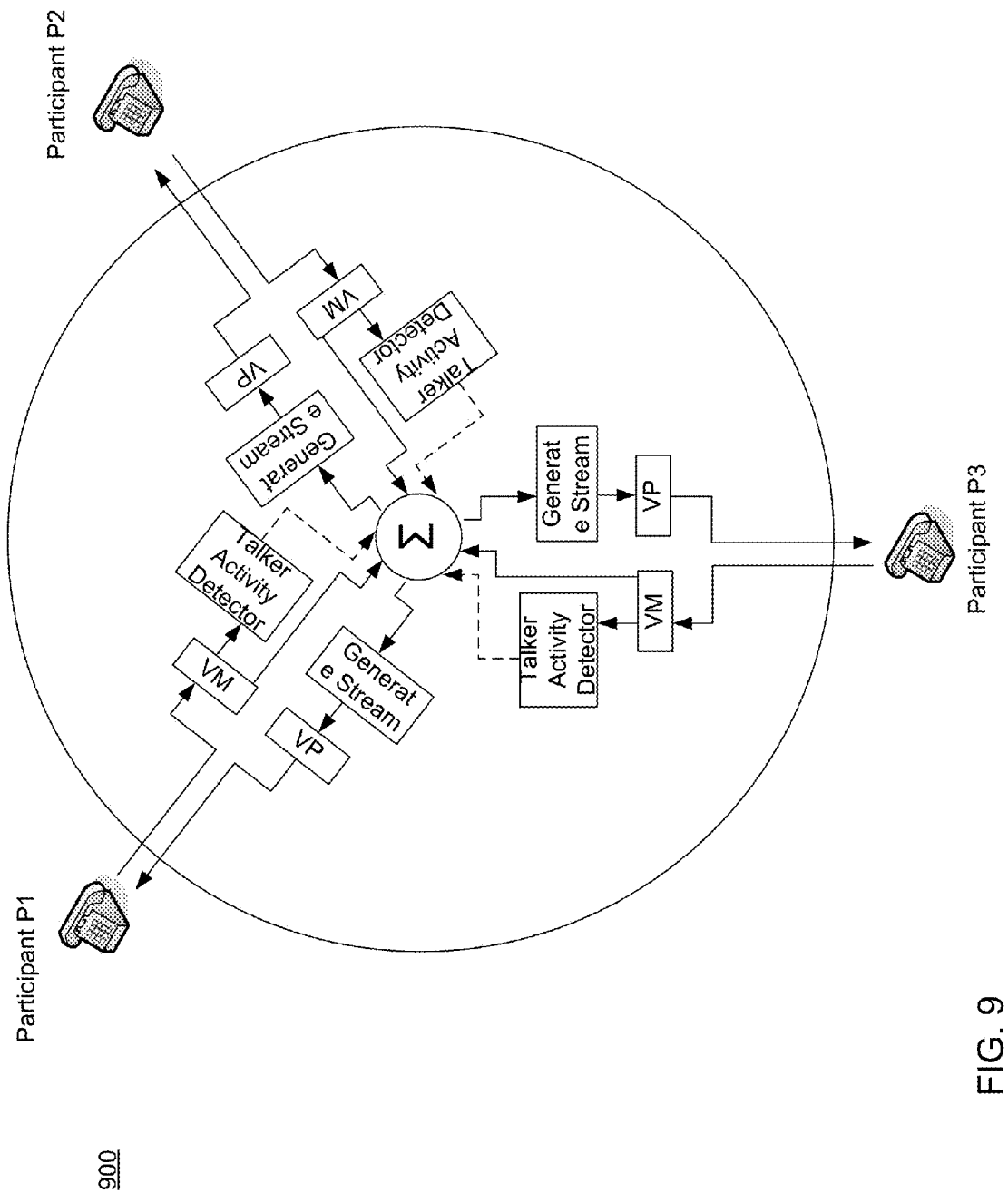
FIG. 9 is a diagrammatic view of a system configured to implement an audio conferencing process in accordance with an embodiment of the present disclosure.

Referring now to FIG. 9, an embodiment of audio conferencing process 10 depicting a centralized mixer having Top-N mixing and VQA is provided. In this particular embodiments, the voice quality enhancement module ("VM") may be configured to receive an audio stream from each participant. The VM module may perform ANR followed by AEC and then ALC operations. In some embodiments, supporting modules, which may include, but are not limited to, VAD and VADPP may also be used to assist in the ANR, AEC and ALC operations. In some cases, the VM module may be configured to operate only on individual streams. After processing is performed at the VM module, the stream may be provided directly to the mixer or may be sent to a talker activity detector ("TAD"). The TAD may be configured to determine if a participant has been talking by using the VAD decision made by the VAD and other power measurements made in the VM.

Once the stream is received at the mixer, the streams may be ranked and Top-N mixing may be performed. As discussed above, the ranking vector may include, but is not limited to, the rank of the participant, active speech level (e.g., dBm), talker activity (e.g., seconds), how often the participant talks in bursts, etc. Accordingly, embodiments of audio conferencing process 10 may be configured to learn the rank of a particular participant connected to the cascade of mixers connected to this mixer. Appropriate mixing may then be carried out with this information.

After leaving the mixer, a mixed stream may be generated for each participant using a generate stream module ("GS"). The GS may be configured to prevent a participant's voice from being played back to the same participant. This may be necessary, for example, in order to create customized mixed stream for each of the participants. The voice quality enhancement module towards the participant ("VP") may be configured to perform EVI followed by ALE. In some embodiments, the VP may operate on mixed streams typically and may be the last step before the mixed stream is played out to the participant.

Figure 10:
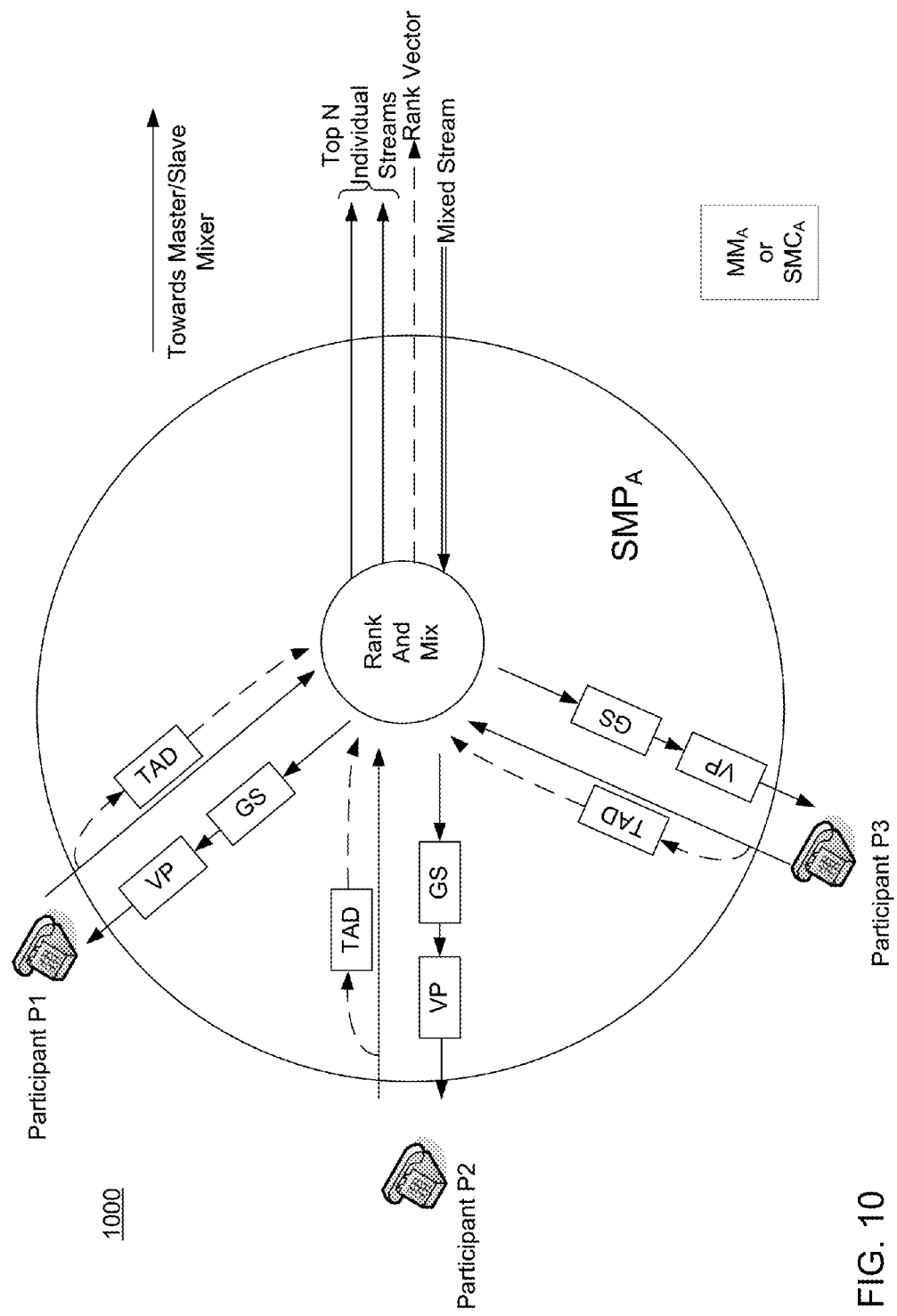
FIG. 10 is a diagrammatic view of a system configured to implement an audio conferencing process in accordance with an embodiment of the present disclosure.
Figure 11:
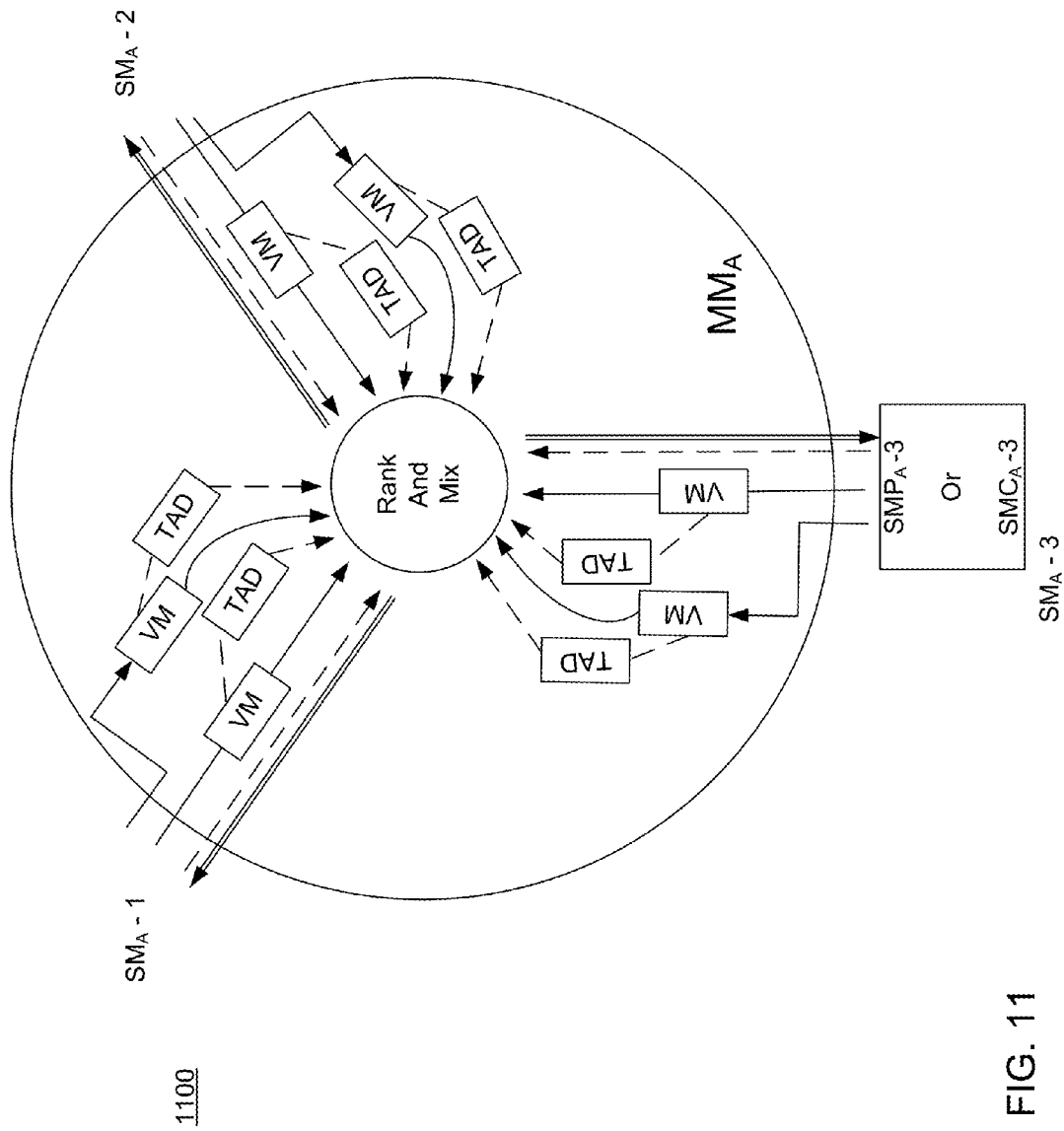
FIG. 11 is a diagrammatic view of a system configured to implement an audio conferencing process in accordance with an embodiment of the present disclosure.

Referring now to FIG. 10, an embodiment of audio conferencing process 10 depicting a type-A slave mixer for participants ("$SMP_A$") is provided. As shown in FIG. 10, many of the components and modules described above with reference to FIG. 9 may be employed here as well. In some embodiments, the $SMP_A$ may be configured to select the top-N talkers from the participants. Additionally and/or alternatively, the $SMP_A$ may also send individual streams along with the rank vector towards an $SMC_A$ and/or an $MM_A$. The $MM_A$ may mix the top-N individual streams and may send the mixed stream back to slave mixers. In some embodiments, the $SMP_A$ may be configured to generate individual mixed streams for each of its participants from the mixed stream received from $MM_A$ Referring now to FIG. 11, an embodiment of audio conferencing process 10 depicting a type-A master mixer ("$MM_A$") is provided. Each $MM_A$ may be configured to send and receive information with one or more $SM_A$ mixers. The $SM_A$ mixers may be participant and/or cascading in nature.

Figure 12:
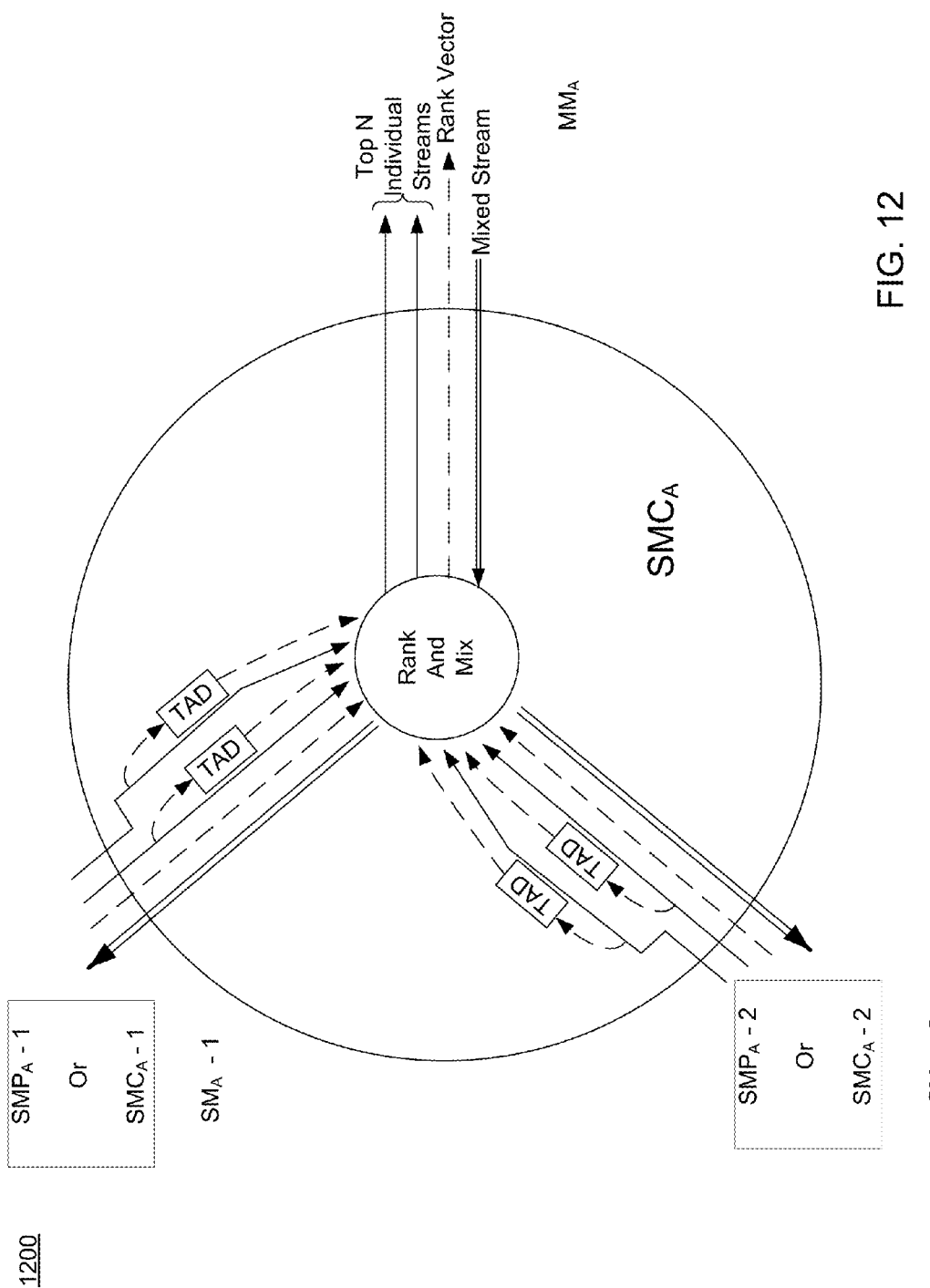
FIG. 12 is a diagrammatic view of a system configured to implement an audio conferencing process in accordance with an embodiment of the present disclosure.

Referring now to FIG. 12, an embodiment of audio conferencing process 10 depicting a type-A slave mixer for cascading ("$SMC_A$") is provided. As shown in the Figure, each $SMC_A$ may be in communication with one or more $SM_A$ mixers as well as an $MM_A$. The $SM_A$ mixers may be participant and/or cascading in nature.

Figure 13:
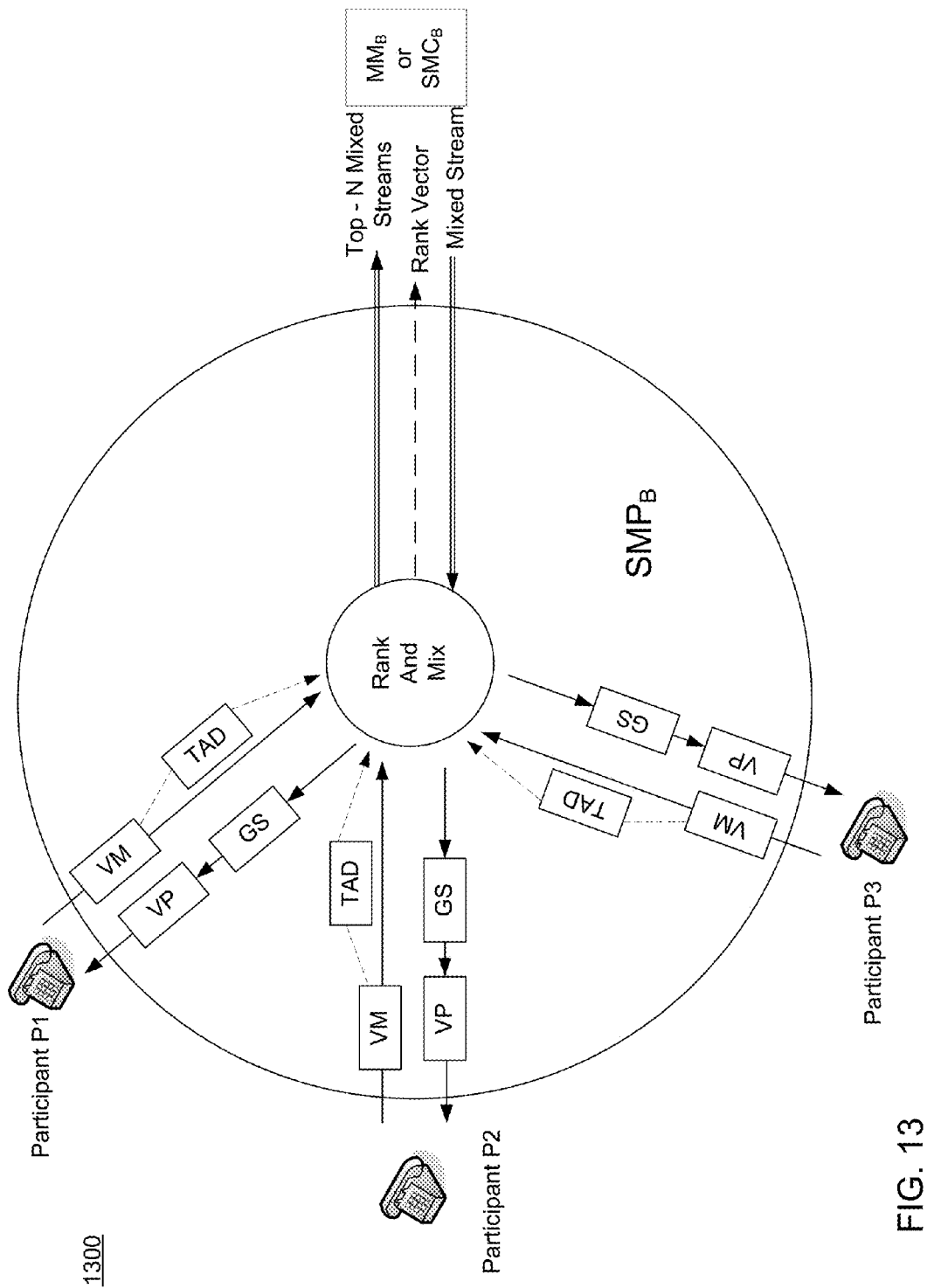
FIG. 13 is a diagrammatic view of a system configured to implement an audio conferencing process in accordance with an embodiment of the present disclosure.

Referring now to FIG. 13, an embodiment of audio conferencing process 10 depicting a type-B slave mixer for participants ("$SMP_B$") is provided. In this particular embodiment, the $SMP_B$ may be configured to select the top-N talkers from the participants. A mixed stream may be sent along with the rank vector towards $SMC_B$ or $MM_B$. The $MM_B$ may be configured to mix the top-N individual streams by mixing top-M mixed streams and transmitting the mixed stream back to the slave mixers. The $SMP_B$ may be configured to generate individual mixed streams for each of its participants from the mixed stream received from $MM_B$.

Figure 14:
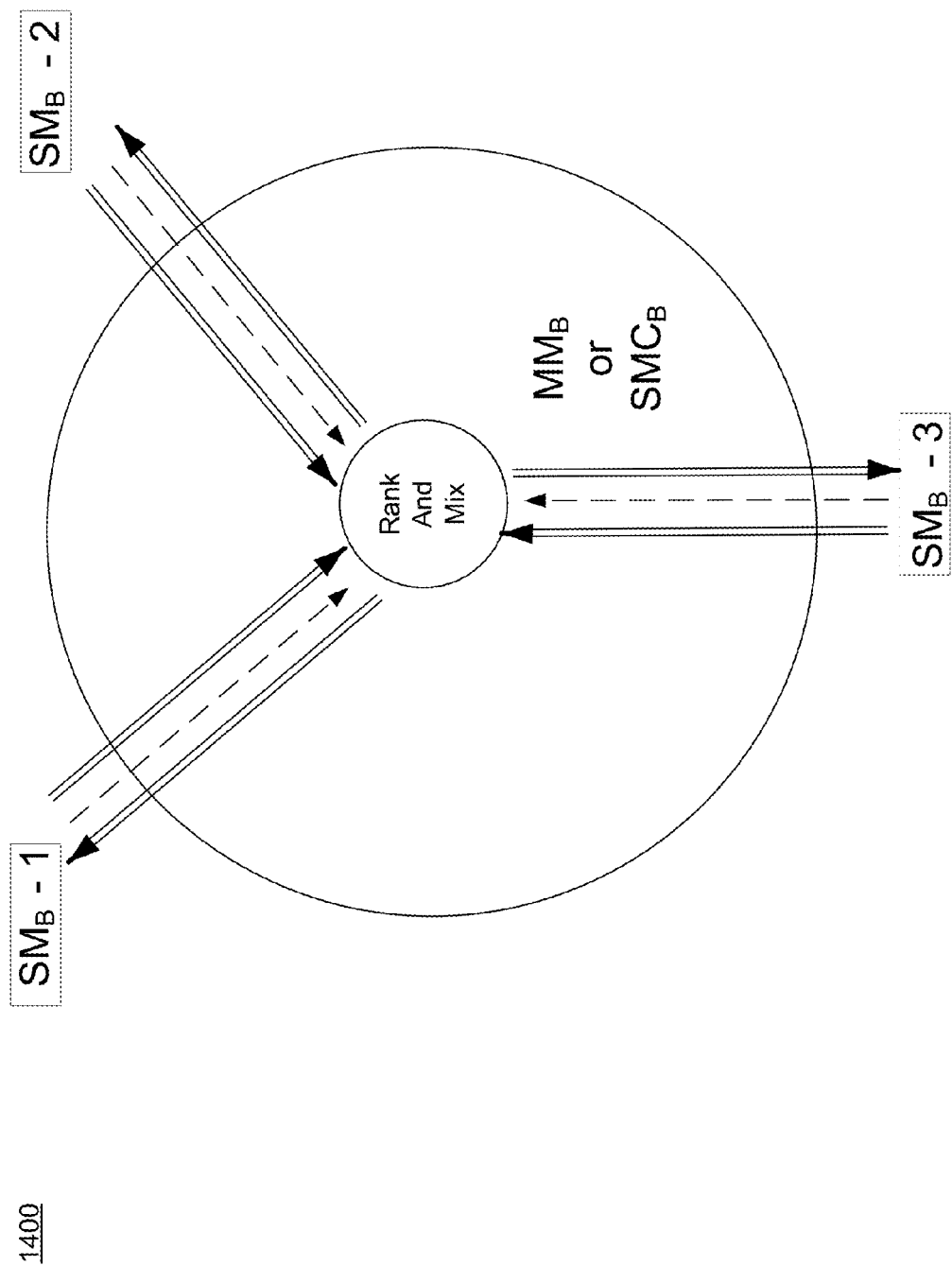
FIG. 14 is a diagrammatic view of a system configured to implement an audio conferencing process in accordance with an embodiment of the present disclosure.

Referring now to FIG. 14, an embodiment of audio conferencing process 10 depicting a type-B master mixer ("MMB") and/or a type-B slave mixer for cascading ("$SMC_B$") is provided. In this particular embodiment, the MMB and/or $SMC_B$ may be in communication with one or more slave mixers (e.g., $SM_B$(1-3)).

Figure 15:
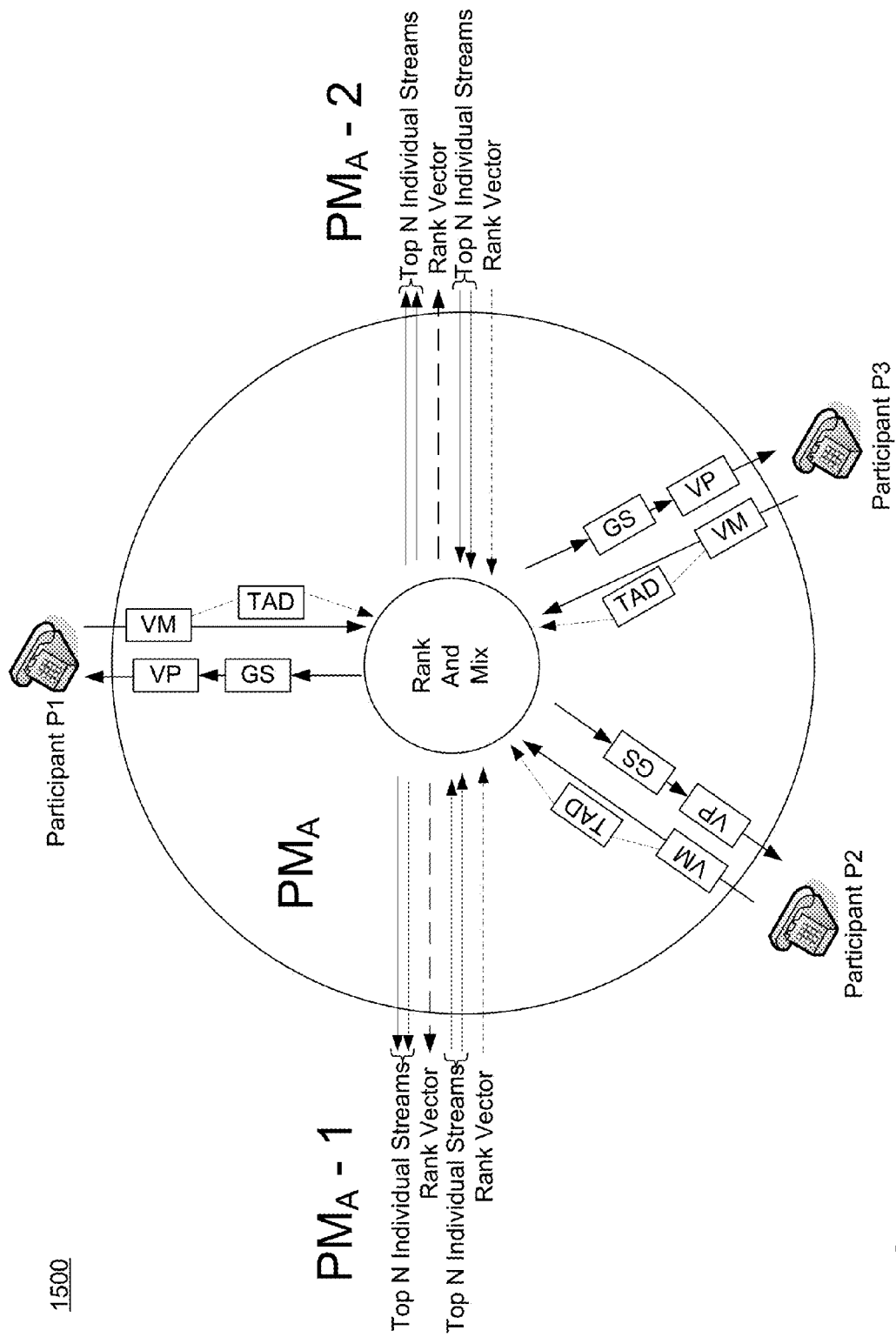
FIG. 15 is a diagrammatic view of a system configured to implement an audio conferencing process in accordance with an embodiment of the present disclosure.

Referring now to FIG. 15, an embodiment of audio conferencing process 10 depicting a type-A peer mixer ("$PM_A$") is provided. In some embodiments, each $PM_A$ may be configured to select the top-N talkers from the participants. The $PM_A$ may also transmit individual streams along with the rank vectors to the peer mixers connected to it. There could be at most two $PM_A$ mixers connected. Each $PM_A$ may generate a per participant mixed stream based on the individual streams coming from other participants and peer mixers connected to it.

Figure 16:
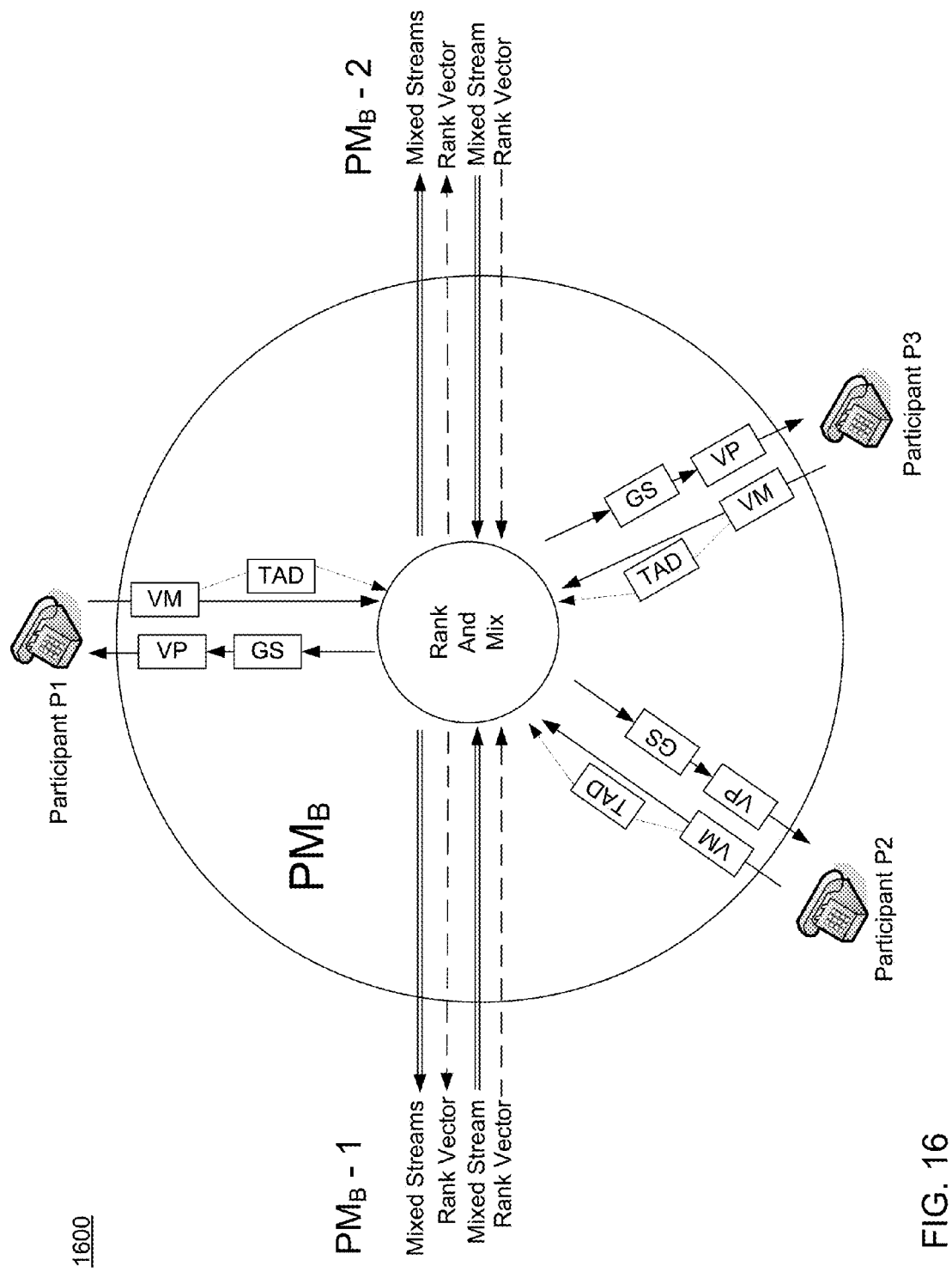
FIG. 16 is a diagrammatic view of a system configured to implement an audio conferencing process in accordance with an embodiment of the present disclosure.

Referring now to FIG. 16, an embodiment of audio conferencing process 10 depicting a type-B peer mixer ("$PM_B$") is provided. In some embodiments, each $PM_B$ may be configured to select the top-N talkers from the participants. The $PM_B$ may also transmit the mixed stream along with the rank vectors to the peer mixers connected to it. There could be at most two $PM_B$ mixers connected. Each $PM_B$ may generate a per participant mixed stream based on the individual streams coming from other participants and mixed streams coming from other peer mixers connected to it.

Figure 17:
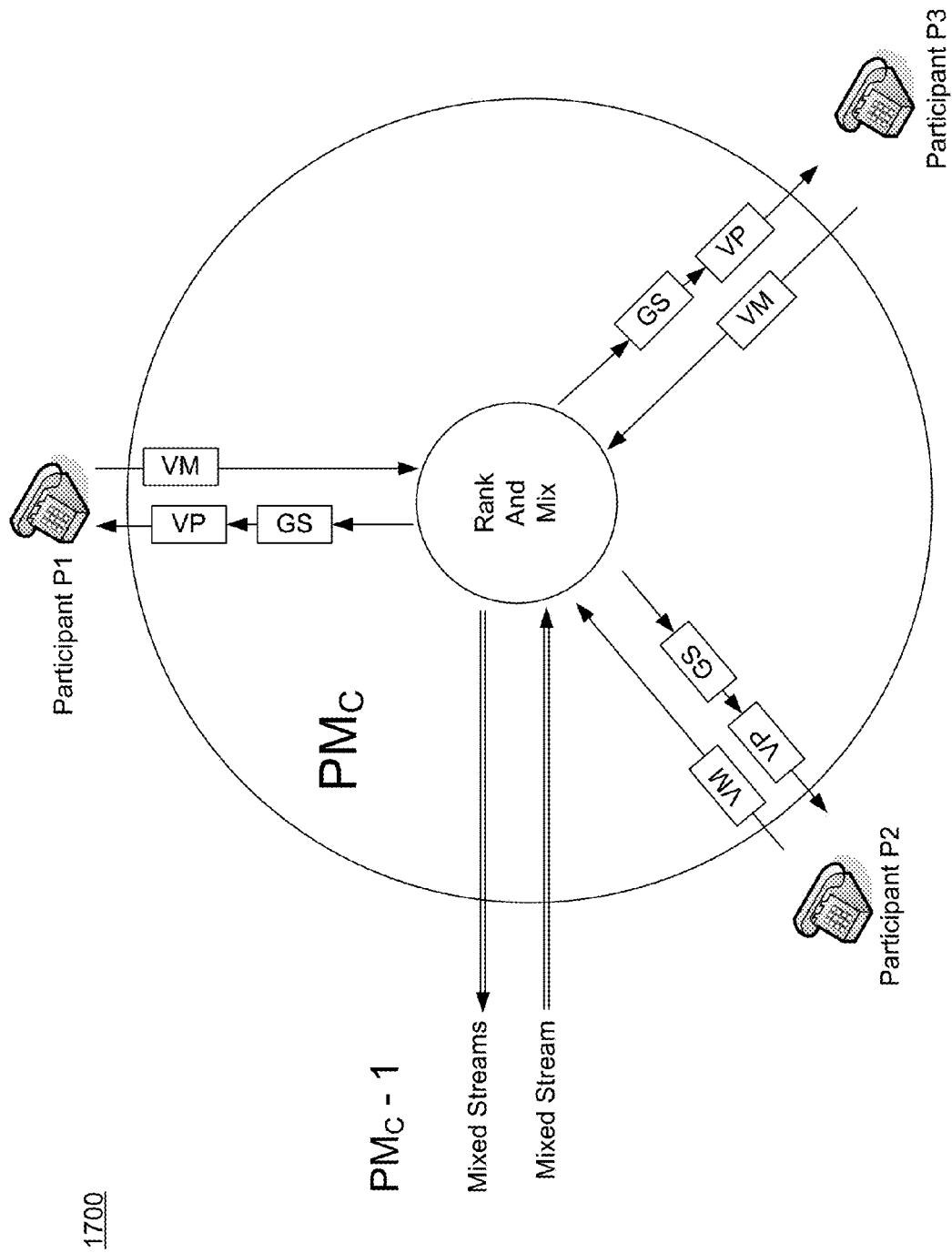
FIG. 17 is a diagrammatic view of a system configured to implement an audio conferencing process in accordance with an embodiment of the present disclosure.

Referring now to FIG. 17, an embodiment of audio conferencing process 10 depicting a type-C peer mixer ("$PM_C$") is provided. The $PM_C$ is a variation of the type-B peer mixer $PM_B$, where there is no ranking vector shared between mixers. For example, this may be possible where there are very few participants connected to a peer mixer and there are only two peer mixers overall.

Figure 18:
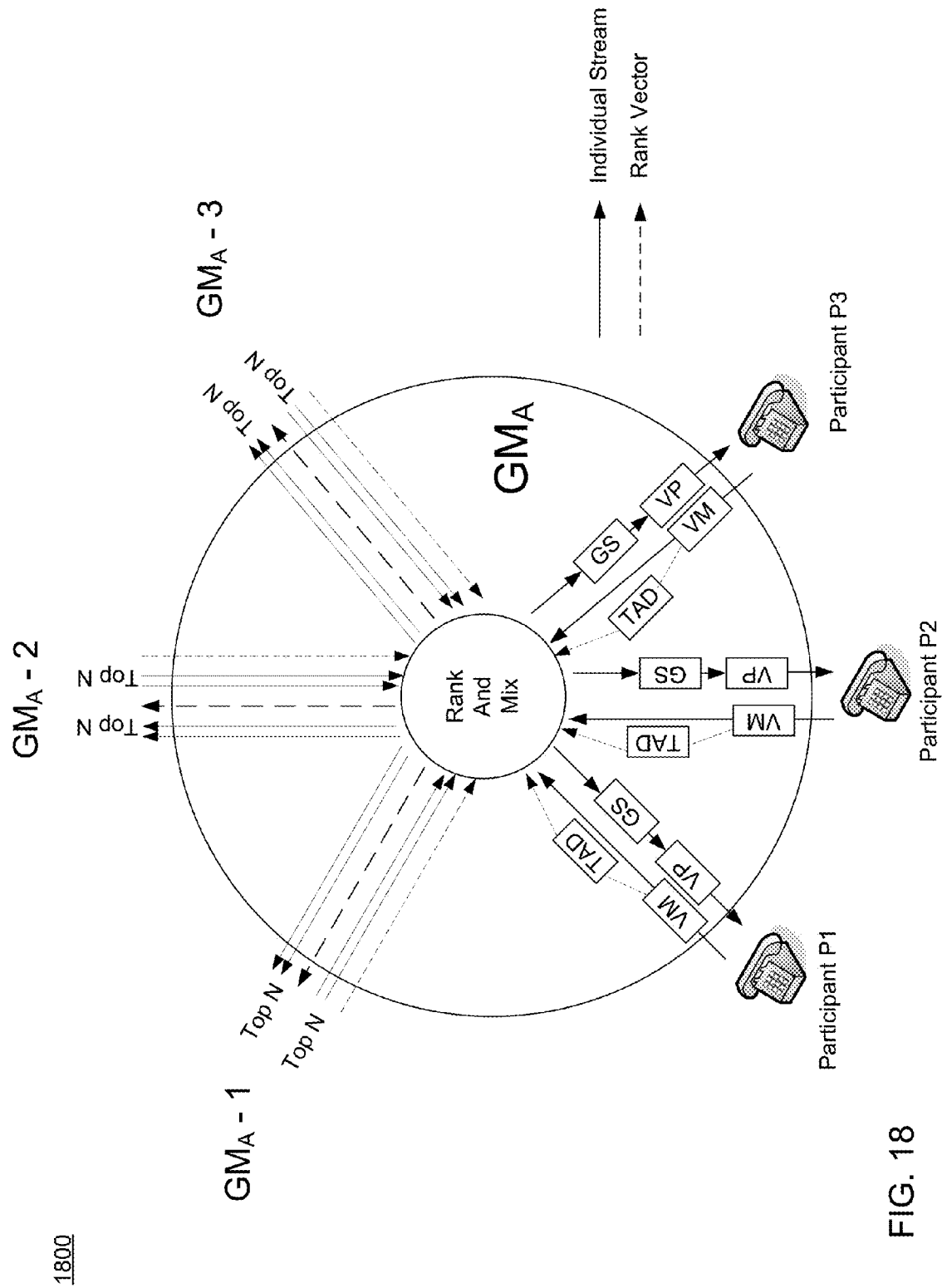
FIG. 18 is a diagrammatic view of a system configured to implement an audio conferencing process in accordance with an embodiment of the present disclosure.

Referring now to FIG. 18, an embodiment of audio conferencing process 10 depicting a type-A grid mixer ("$GM_A$") is provided. Each $GM_A$ may function similarly to the $PM_A$ described above, however, without any restriction on the number of mixers connected to it. This type of configuration may allow for additional built-in redundancy. In the figure, each individual stream is denoted by a solid line and the rank vector is denoted by a dashed line.

Figure 19:
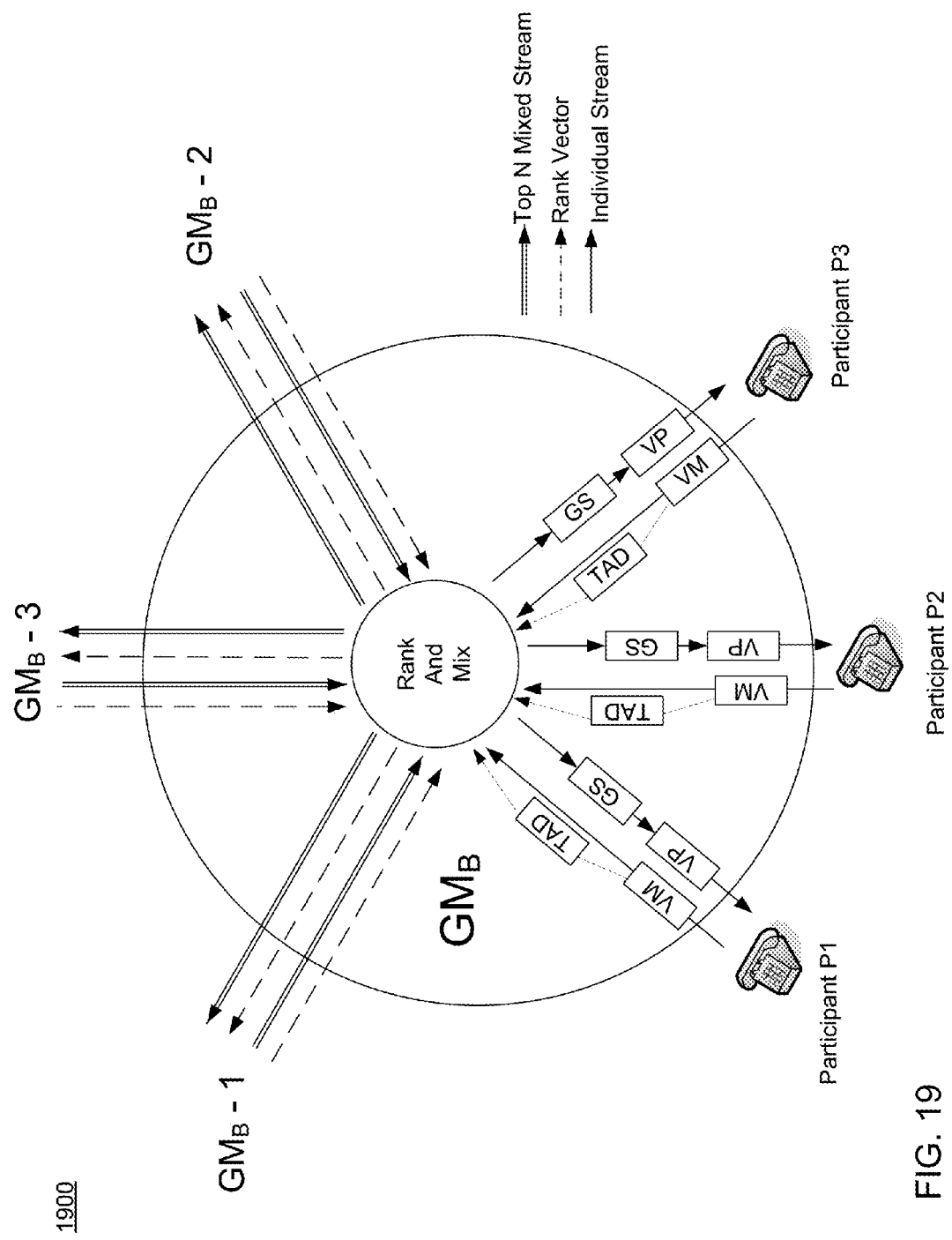
FIG. 19 is a diagrammatic view of a system configured to implement an audio conferencing process in accordance with an embodiment of the present disclosure.

Referring now to FIG. 19, an embodiment of audio conferencing process 10 depicting a type-B grid mixer ("$GM_B$") is provided. Like the $GM_A$, each $GM_A$ may function similarly to the $PM_A$ described above, however, without any restriction on the number of mixers connected to it. This type of configuration may allow for additional built-in redundancy. In the figure, each individual stream is denoted by a solid line, the rank vector is denoted by a dashed line, and the top-N mixed stream is denoted by a double line.

Figure 20:
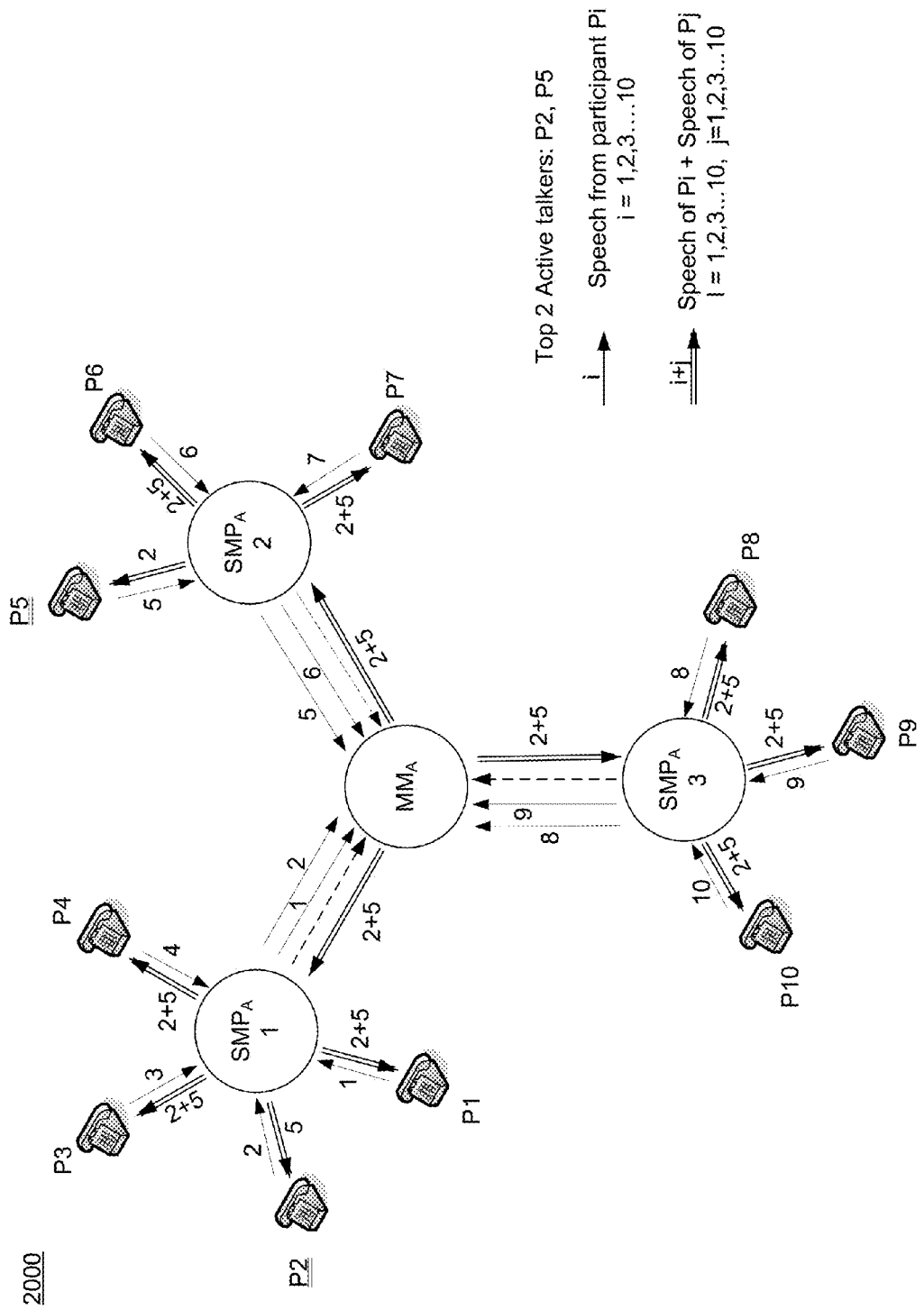
FIG. 20 is a diagrammatic view of a system configured to implement an audio conferencing process in accordance with an embodiment of the present disclosure.

Referring now to FIG. 20, an embodiment of audio conferencing process 10 depicting an example of top-2 mixing using a type-A master-slave mixing method is provided. In this particular embodiment, a master mixer is connected to three participant slave mixers. Each participant mixer is in communication with a number of participants. In this example, eight participants are shown and their speech is labeled accordingly (e.g., speech from participant $P_i$ is denoted by a single line on the figure, while speech from participant $P_i$+participant $P_j$ is denoted by a double line on the figure). Using the teachings of the present disclosure, in this particular example the top-2 most active talkers are participants 2 and 5.

Figure 21:
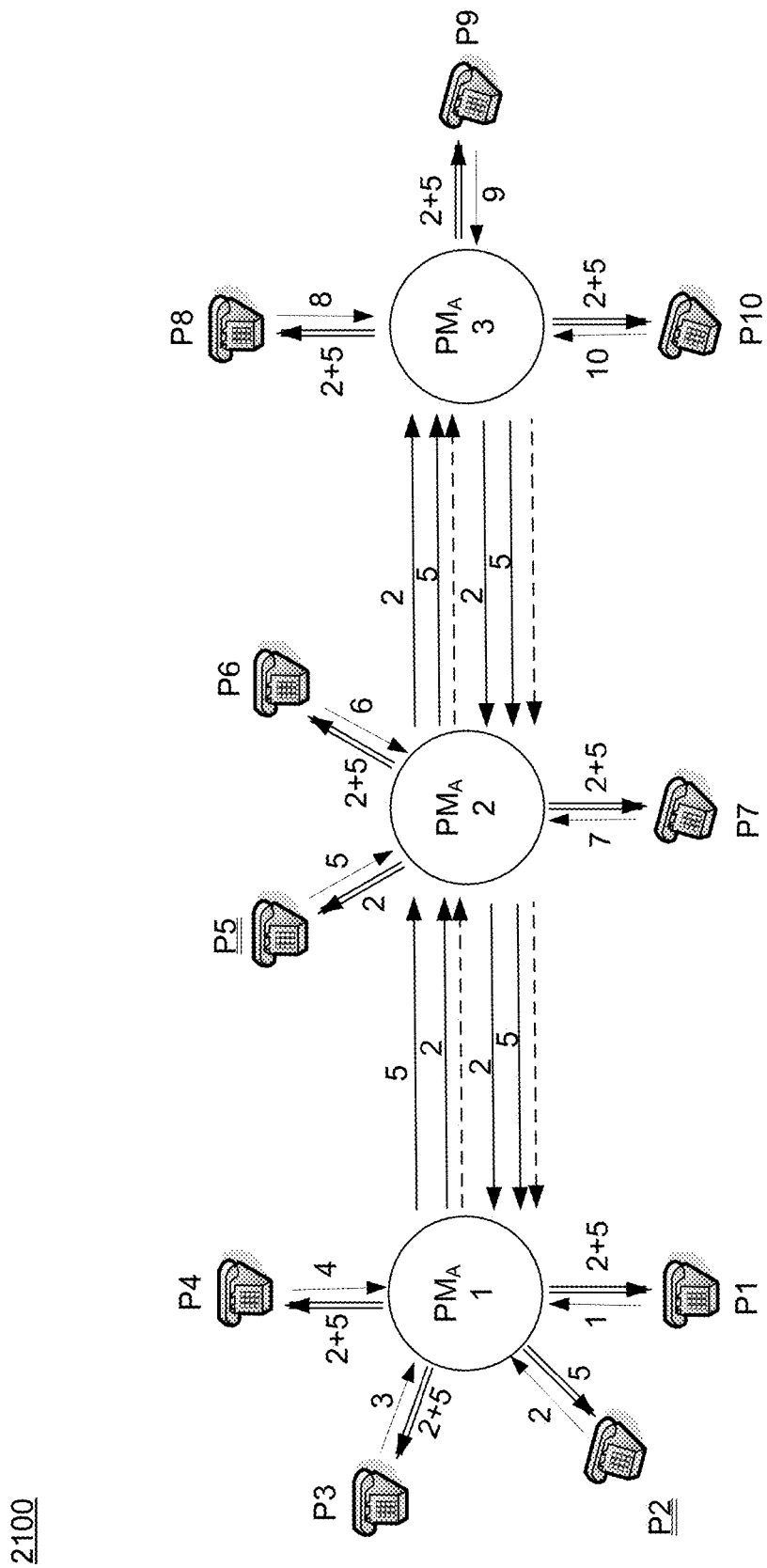
FIG. 21 is a diagrammatic view of a system configured to implement an audio conferencing process in accordance with an embodiment of the present disclosure.

Referring now to FIG. 21, an embodiment of audio conferencing process 10 depicting an example of top-2 mixing using type-A peer mixing methodology is provided. In this particular embodiment, a peer mixer is connected to two other peer mixers. Each peer mixer is in communication with a number of participants. In this example, ten participants are shown and their speech is labeled accordingly (e.g., speech from participant $P_i$ is denoted by a single line on the figure, while speech from participant $P_i$+participant $P_j$ is denoted by a double line on the figure). Using the teachings of the present disclosure, in this particular example the top-2 most active talkers are participants 2 and 5.

Figure 22:
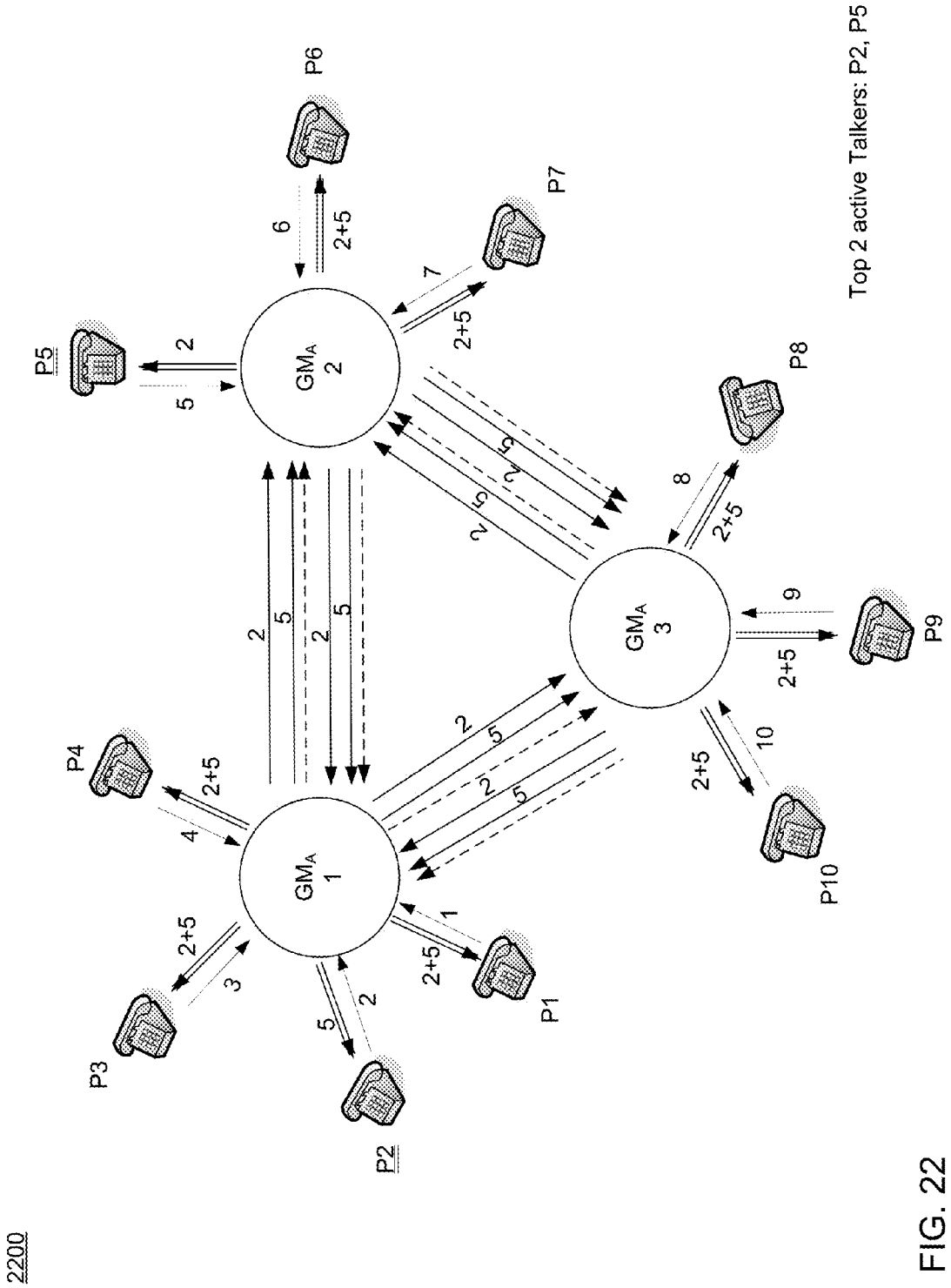
FIG. 22 is a diagrammatic view of a system configured to implement an audio conferencing process in accordance with an embodiment of the present disclosure.

Referring now to FIG. 22, an embodiment of audio conferencing process 10 depicting an example of top-2 mixing using type-A grid mixing methodology is provided. In this particular embodiment, a grid mixer is connected to two other grid mixers. Each grid mixer is in communication with a number of participants. In this example, ten participants are shown and their speech is labeled accordingly (e.g., speech from participant $P_i$ is denoted by a single line on the figure, while speech from participant $P_i$+participant $P_j$ is denoted by a double line on the figure). Using the teachings of the present disclosure, in this particular example the top-2 most active talkers are participants 2 and 5.

It should be noted that in addition to mixing capabilities, some or all of the mixers described herein may include voice quality enhancement capabilities. For example, noise reduction (ANR), echo suppression (AEC) and level control (ALC) may be applied on individual streams before mixing. Enhanced voice intelligibility (EVI) and adaptive level equalization (ALE) may be applied as the last step on the customized mixed stream generated for each of the participants.

In some embodiments, only the central mixer may perform mixing, for example, the other mixers may not mix but transmit the top-N voice streams instead. This type of arrangement may conserve transmission bandwidth (e.g., for transmitting N streams instead of a single stream) using discontinuous transmission ("DTX") and silence descriptor ("SID").

In some embodiments, each mixer may be configured to send a mixed stream to the central mixer along with the ranked user activity data. Accordingly, the central mixer might accomplish top-N mixing by selecting <N streams. It can accomplish this because each of those streams comes with additional information about their corresponding activity level. In this way, the central mixer may perform a final central ranking of all the users and then select only those streams that carry the top-N speakers (e.g., possibly only 1 or 2). This kind of mixing may also be performed at every mixer level.

In some embodiments, ALE and EVI may occur only on the final outgoing links that connect to the users (e.g., not in the mixer). Additionally and/or alternatively, echo cancellation, noise reduction and level control may operate at the mixer level, which may also address possible coupling between multiple participants across sub-mixers).

In some embodiments, the mixing algorithm on every mixer may be the same. For example, each mixer may assume that it is receiving inputs from multiple other mixers. Inputs from individual users may be treated as an input from a mixer with one user. If every mixer performs a local ranking then the stream from the central mixer may control because the stream and ranking associated with the central mixer may often have the highest activity level.

Traditional audio conferencing mixers do not offer certain features for a participant dialing in from a telephone or a mobile phone. Embodiments disclosed herein may enable a participant dialing in using traditional telephone or mobile phone to use certain productivity tools, some of which are easily possible in a web portal based audio conferencing but needs signal processing approach to provide them for telephone calls. Accordingly, the mixer may include the capability to understand the sequence of DTMF digits punched in by any participant in-band or out-of-band of speech media.

Embodiments of audio conferencing process 10 may also enable a participant in an audio conference to join using a traditional telephone or mobile phone. Accordingly, a user may be allowed to catch up with the last "N" seconds of the conference. For example, a participant could enter a predefined dual-tone multi-frequency ("DTMF") sequence combination and listen to the last N seconds of conversation that he/she might have missed as a result of stepping out of the conference or joining late. In some embodiments, the process may include buffering up the mixed stream generated by mixing the voice streams from all participants in an audio conference. Depending on the memory available on the machine in which the audio conferencing is running, the value of N may be defined. The process may also include playing back the last N seconds of mixed stream on top of the current running audio conference. In some embodiments, upon entering the predefined DTMF sequence the mixer may be notified that this specific participant is requesting the playback and the mixer may generate a new mixed stream for this participant where the mixed stream from the ongoing conference is mixed with the recorded mixed stream. The ongoing mixed stream could be mixed below the recorded mixed stream (e.g. 6-9 dB) so that it is played in the background. After the playback is completed the mixer may send the ongoing mixed stream at its original level.

Additionally and/or alternatively, in some embodiments a mute indicator may be provided. In this example, a participant could enter a predefined DTMF sequence combination and listen to an announcement indicating if he/she is on mute or not. Although traditional conferences offer a predefined DTMF sequence to enable or disable mute, most participants would prefer using the mute option on their handsets as each conference could have a separate predefined mute enable sequence. In this example, a participant may enter a predefined DTMF sequence to obtain the status of the mute. The mixer may measure the energy coming on the leg from this participant and if it is less than a certain threshold (e.g., −45 dBm) then the mixer may send a mute notification as an announcement to the participant. The mixer may also use the information of the state of that participant if he has enabled or disabled mute on that line. This approach still works if the participant uses handset or the conference to mute the line.

In some embodiments, a virtual hand raising option may also be provided. For example, in an online classroom where one speaker (e.g. teacher) is lecturing while majority of the participants (e.g. students) are listening, a participant can raise his/her hand virtually to ask a question by entering a predefined DTMF sequence. The host (e.g. teacher) in this case may hear a special interrupt tone to which the teacher can act at a meaningful stop. The mixer may act upon receiving the DTMF sequence and may play a notification tone to the moderator. The moderator may then interrupt the conversation at a convenient time to take the question from this participant.

In some embodiments, a list of participants may also be provided. In this example, a participant could enter a predefined DTMF sequence combination and listen to a list of participants on the conference without interrupting the conversation. Upon receiving the sequence, the mixer may generate a new audio notification containing a list of participants on the call. Concatenating the recording of the name of the participant as each participant joins the conference can generate this audio of list of participants. The mixer can mix this audio of list of participants on top of the ongoing conference at a level (e.g., 6-9 dB) lower than the ongoing conference.

Figure 23:
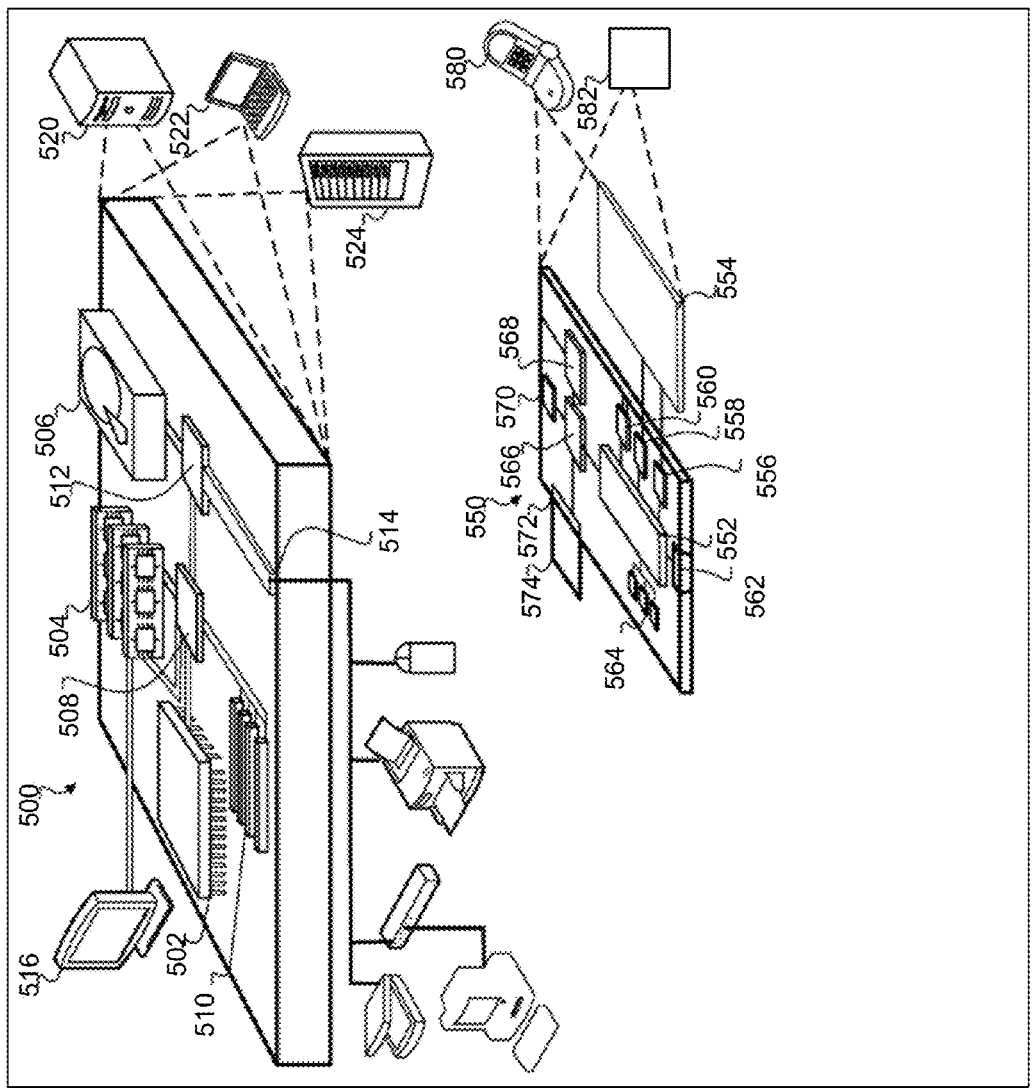
FIG. 23 shows an example of a computer device and a mobile computer device that can be used to implement embodiments of the present disclosure.

Referring now to FIG. 23, an example of a generic computer device 2300 and a generic mobile computer device 550, which may be used with the techniques described herein is provided. Computing device 2300 is intended to represent various forms of digital computers, such as tablet computers, laptops, desktops, workstations, personal digital assistants, servers, blade servers, mainframes, and other appropriate computers. In some embodiments, computing device 550 can include various forms of mobile devices, such as personal digital assistants, cellular telephones, smartphones, and other similar computing devices. Computing device 550 and/or computing device 2300 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 2300 may include processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, may be interconnected using various busses, and may be mounted on a common motherboard or in other manners as appropriate. The processor 502 can process instructions for execution within the computing device 2300, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 2300 may be connected, with each device providing portions of the necessary operations (e.g., as a server bank, a group of blade servers, or a multiprocessor system).

Memory 504 may store information within the computing device 2300. In one implementation, the memory 504 may be a volatile memory unit or units. In another implementation, the memory 504 may be a non-volatile memory unit or units. The memory 504 may also be another form of computer-readable medium, such as a magnetic or optical disk.

Storage device 506 may be capable of providing mass storage for the computing device 2300. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

High speed controller 508 may manage bandwidth-intensive operations for the computing device 2300, while the low speed controller 512 may manage lower bandwidth-intensive operations. Such allocation of functions is exemplary only. In one implementation, the high-speed controller 508 may be coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 2300 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 2300 may be combined with other components in a mobile device (not shown), such as device 550. Each of such devices may contain one or more of computing device 2300, 550, and an entire system may be made up of multiple computing devices 2300, 550 communicating with each other.

Computing device 550 may include a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, may be interconnected using various buses, and several of the components may be mounted on a common motherboard or in other manners as appropriate.

Processor 552 may execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

In some embodiments, processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

In some embodiments, memory 564 may store information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

Computing device 550 may be implemented in a number of different forms, as shown in the figure. For example, it may be implemented as a cellular telephone 580. It may also be implemented as part of a smartphone 582, personal digital assistant, remote control, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method for audio conferencing comprising:
    receiving, at a first mixing device, a first set of audio signals including a first audio signal associated with an audio conference;
    generating a ranking, at the first mixing device, of each user associated with the first set of audio signals based upon one or more features of the first set of audio signals including a speaking length of time of each user associated with the first set of audio signals;
    processing at least one audio signal of the first set of audio signals at the first mixing device to generate a first set of processed audio signals based upon, at least in part, the ranking of each user associated with the first set of audio signals, wherein processing the at least one audio signal of the first set of audio signals at the first mixing device includes applying a voice quality enhancement algorithm to the at least one audio signal of the first set of audio signals;
    transmitting at least one audio signal of the first set of processed audio signals to a second mixing device, wherein the first mixing device and the second mixing device are distributed over a network in a cascaded configuration;
    receiving, at the second mixing device, a second set of audio signals including a second audio signal associated with the audio conference;
    generating a ranking, at the second mixing device, of each user associated with the second set of audio signals based upon one or more features of the second set of audio signals including a speaking length of time of each user associated with the second set of audio signals;
    dynamically updating at least one of the rankings based upon, at least in part, at least one of the first audio signal and the second audio signal; and
    processing at least one audio signal of the second set of audio signals at the second mixing device to generate a second set of processed audio signals based upon, at least in part, the ranking of each user associated with the second set of audio signals, wherein processing the at least one audio signal of the second set of audio signals at the second mixing device includes applying the voice quality enhancement algorithm to the at least one audio signal of the second set of audio signals, wherein applying the voice quality enhancement algorithm includes applying at least one of noise reduction, echo cancellation, and level control enhancements to at least one of the first audio signal and the second audio signal.

2. The method of claim 1, further comprising:
    transmitting an audio signal of at least one of the first set of processed audio signals and the second set of processed audio signals to a third mixing device.

3. The method of claim 2, wherein the third mixing device and the second mixing device are distributed over the network in the cascaded configuration.

4. The method of claim 1, wherein the one or more features further include at least one of frequency of user speech, quality of user speech and duration of user speech.

5. The method of claim 1, further comprising:
    transmitting, from the second mixing device, at least one of a voice intelligibility and an adaptive level enhancement solution to a listening environment of each user.

6. An audio conferencing system comprising:
    a first mixing device configured to receive a first set of audio signals including a first audio signal associated with an audio conference, the first mixing device further configured to generate a ranking of each user associated with the first set of audio signals based upon, at least in part, one or more features of the first set of audio signals including a speaking length of time of each user associated with the first set of audio signals, the first mixing device further to process at least one audio signal of the first set of audio signals at the first mixing device to generate a first set of processed audio signals based upon, at least in part, the ranking of each user associated with the first set of audio signals, wherein processing the at least one audio signal of the first set of audio signals at the first mixing device includes applying the voice quality enhancement algorithm to the at least one audio signal of the first set of audio signals, the first mixing device further to transmit at least one audio signal of the first set of processed audio signals to a second mixing device; and
    a second mixing device configured to receive the first processed audio signal, wherein the first mixing device and the second mixing device are distributed over a network in a cascaded configuration, the second mixing device configured to receive a second set of audio signals including a second audio signal associated with the audio conference, the second mixing device further configured to generate a ranking of each user associated with the second set of audio signals based upon, at least in part, one or more features of the second set of audio signals including a speaking length of time of each user associated with the second set of audio signals, the second mixing device further configured to dynamically update at least one of the rankings based upon, at least in part, at least one of the first audio signal and the second audio signal, the second mixing device further to process at least one audio signal of the second set of audio signals at the second mixing device to generate a second set of processed audio signals based upon, at least in part, the ranking of each user associated with the second set of audio signals, wherein processing the at least one audio signal of the second set of audio signals at the second mixing device includes applying the voice quality enhancement algorithm to the at least one audio signal of the second set of audio signals, wherein applying the voice quality enhancement algorithm includes applying at least one of noise reduction, echo cancellation, and level control enhancements to at least one of the first audio signal and the second audio signal.

7. The system of claim 6, wherein at least one of the first mixing device and the second mixing device are further configured to transmit an audio signal of at least one of the first set of processed audio signals and the second set of processed audio signals to a third mixing device.

8. The system of claim 7, wherein the third mixing device and the second mixing device are distributed over the network in the cascaded configuration.

9. The system of claim 6, wherein the one or more further include at least one of frequency of user speech, quality of user speech and duration of user speech.

10. The system of claim 6, wherein the second mixing device is further configured to transmit at least one of a voice intelligibility and an adaptive level enhancement solution to a listening environment of each user.

11. A computer program product residing on a non-transitory computer readable storage medium having a plurality of instructions stored thereon which, when executed across one or more processors, causes at least a portion of the one or more processors to perform operations comprising:

receiving, at a first mixing device, a first set of audio signals including a first audio signal associated with an audio conference;

generating a ranking, at the first mixing device, of each user associated with the first set of audio signals based upon one or more features of the first set of audio signals including a speaking length of time of each user associated with the first set of audio signals;

processing at least one audio signal of the first set of audio signals at the first mixing device to generate a first set of processed audio signals based upon, at least in part, the ranking of each user associated with the first set of audio signals, wherein processing the at least one audio signal of the first set of audio signals at the first mixing device includes applying a voice quality enhancement algorithm to the at least one audio signal of the first set of audio signals;

transmitting at least one audio signal of the first set of processed audio signals to a second mixing device, wherein the first mixing device and the second mixing device are distributed over a network in a cascaded configuration;

receiving, at the second mixing device, a second set of audio signals including a second audio signal associated with the audio conference;

generating a ranking, at the second mixing device, of each user associated with the second set of audio signals based upon one or more features of the second set of audio signals including a speaking length of time of each user associated with the second set of audio signals;

dynamically updating at least one of the rankings based upon, at least in part, at least one of the first audio signal and the second audio signal; and processing at least one audio signal of the second set of audio signals at the second mixing device to generate a second set of processed audio signals based upon, at least in part, the ranking of each user associated with the second set of audio signals, wherein processing the at least one audio signal of the second set of audio signals at the second mixing device includes applying the voice quality enhancement algorithm to the at least one audio signal of the second set of audio signals, wherein applying the voice quality enhancement algorithm includes applying at least one of noise reduction, echo cancellation, and level control enhancements to at least one of the first audio signal and the second audio signal.

\* \* \* \* \*